US006466573B1

(12) United States Patent
Renucci

(10) Patent No.: US 6,466,573 B1
(45) Date of Patent: Oct. 15, 2002

(54) SYSTEM AND METHOD FOR COMMUNICATING TELECOMMUNICATION INFORMATION BETWEEN A TELECOMMUNICATION SWITCH AND CUSTOMER PREMISES EQUIPMENT

(75) Inventor: Peter J. Renucci, Grapevine, TX (US)

(73) Assignee: General Bandwidth Inc., Austin, TX (US)

( * ) Notice: Subject to any disclaimer, the term of this patent is extended or adjusted under 35 U.S.C. 154(b) by 0 days.

(21) Appl. No.: 09/502,670

(22) Filed: Feb. 11, 2000

(51) Int. Cl.[7] .......................... H04L 12/28; H04L 12/66; H04M 11/00
(52) U.S. Cl. ....................... 370/352; 370/389; 370/401; 379/88.17; 379/93.07; 379/93.09
(58) Field of Search .................................. 370/352, 353, 370/354, 357, 360, 389, 401, 465; 379/88.07, 88.17, 93.05, 93.01, 93.06, 93.07, 93.09, 93.14, 93.15; 709/238, 249, 250

(56) References Cited

U.S. PATENT DOCUMENTS

| | | | |
|---|---|---|---|
| 4,381,427 A | 4/1983 | Cheal et al. ............... | 179/2 DP |
| 4,493,092 A | 1/1985 | Adams ......................... | 375/36 |
| 4,504,942 A | 3/1985 | Aro et al. ..................... | 370/58 |
| 4,507,793 A | 3/1985 | Adams ......................... | 375/36 |
| 4,512,025 A | 4/1985 | Frankel et al. ................ | 375/36 |
| 4,578,537 A | 3/1986 | Faggin et al. ............. | 179/2 DP |
| 4,608,686 A | 8/1986 | Barsellotti ................. | 370/69.1 |
| 4,627,046 A | 12/1986 | Bellamy ....................... | 370/58 |
| 4,740,963 A | 4/1988 | Eckley ..................... | 370/110.1 |
| 4,748,656 A | 5/1988 | Gibbs et al. ................... | 379/93 |
| 4,853,949 A | 8/1989 | Schorr et al. .................. | 379/2 |
| 4,881,226 A | 11/1989 | Lechner et al. .......... | 370/110.1 |

(List continued on next page.)

FOREIGN PATENT DOCUMENTS

| | | | |
|---|---|---|---|
| EP | 0 841 831 A2 | 5/1998 | ........... H04Q/11/04 |
| GB | 2313979 A | 10/1997 | .......... H04M/11/06 |
| WO | WO97/23078 | 6/1997 | ........... H04L/12/56 |
| WO | WO 97/37458 | 10/1997 | |
| WO | WO 99/49608 | 9/1999 | |
| WO | WO 01/06720 | 1/2001 | ........... H04Q/11/04 |
| WO | WO 01/13593 A1 | 2/2001 | ........... H04L/12/64 |
| WO | WO 01/13618 A1 | 2/2001 | ........ H04M/11/016 |

OTHER PUBLICATIONS

L. Van Hauwermeiren, et al., "Offering Video Services over Twisted Pair Cables to the Residential Subscriber by means of an ATM based ADSL Transmission System," ISS Symposium, vol. 1, 5 pages, Apr. 1995.

(List continued on next page.)

*Primary Examiner*—Alpus H. Hsu
(74) *Attorney, Agent, or Firm*—Baker Botts L.L.P.

(57) ABSTRACT

A system for communicating telecommunication information between a telecommunication switch and customer premises equipment includes a gateway, a processing module, and a bypass switch. The gateway receives telecommunication information from the telecommunication switch. The gateway generates data packets for communicating the telecommunication information over a local loop circuit in a first mode of operation or generates a first analog signal for communicating the telecommunication information over the local loop circuit in a second mode of operation. The processing module receives the data packets from the local loop circuit and processes the data packets to generate a second analog telephone signal communicating the telecommunication information in the first mode of operation. The bypass switch selects the second analog signal for communication to a subscriber line in the first mode of operation and selects the first analog telephone signal for communication to the subscriber line in the second mode of operation.

16 Claims, 14 Drawing Sheets

U.S. PATENT DOCUMENTS

| | | | | |
|---|---|---|---|---|
| 4,903,292 | A | | 2/1990 | Dillon .......................... 379/93 |
| 5,033,062 | A | | 7/1991 | Morrow et al. ................. 375/7 |
| 5,034,948 | A | | 7/1991 | Mizutani et al. .............. 370/79 |
| 5,042,028 | A | | 8/1991 | Ogawa ....................... 370/58.2 |
| 5,127,003 | A | | 6/1992 | Doll, Jr. et al. .......... 370/110.1 |
| 5,134,611 | A | | 7/1992 | Steinka et al. ................. 370/79 |
| 5,142,568 | A | | 8/1992 | Ogata et al. ................. 379/100 |
| 5,142,571 | A | | 8/1992 | Suzuki et al. ................ 379/279 |
| 5,151,923 | A | | 9/1992 | Fujiwara ......................... 375/5 |
| 5,216,704 | A | | 6/1993 | Williams et al. .............. 379/93 |
| 5,220,560 | A | | 6/1993 | Ogasawara ................... 370/79 |
| 5,267,300 | A | | 11/1993 | Kao et al. ...................... 379/93 |
| 5,305,312 | A | | 4/1994 | Fornek et al. ................. 370/62 |
| 5,317,627 | A | | 5/1994 | Richardson, Jr. et al. ..... 379/88 |
| 5,349,640 | A | | 9/1994 | Dunn et al. .................. 379/387 |
| 5,410,343 | A | | 4/1995 | Coddington et al. ........... 348/7 |
| 5,426,692 | A | | 6/1995 | Fujise .......................... 379/93 |
| 5,448,635 | A | | 9/1995 | Biehl et al. .................. 379/399 |
| 5,459,788 | A | | 10/1995 | Kim ........................... 379/399 |
| 5,473,675 | A | | 12/1995 | Chapman et al. ............. 379/93 |
| 5,479,447 | A | | 12/1995 | Chow et al. .................. 375/260 |
| 5,493,609 | A | | 2/1996 | Winseck, Jr. et al. ......... 379/96 |
| 5,499,241 | A | | 3/1996 | Thompson et al. ............ 370/73 |
| 5,535,198 | A | | 7/1996 | Baker et al. ................... 370/60 |
| 5,594,727 | A | * | 1/1997 | Kolbenson et al. ......... 370/442 |
| 5,604,737 | A | | 2/1997 | Iwami et al. ................ 370/352 |
| 5,610,992 | A | | 3/1997 | Balatoni ...................... 370/468 |
| 5,613,069 | A | | 3/1997 | Walker .................... 395/200.15 |
| 5,617,423 | A | | 4/1997 | Li et al. ....................... 370/426 |
| 5,625,685 | A | | 4/1997 | Allegranza et al. ......... 379/399 |
| 5,638,363 | A | | 6/1997 | Gittins et al. ............... 370/358 |
| 5,661,785 | A | | 8/1997 | Carpenter et al. ........ 379/93.15 |
| 5,668,857 | A | | 9/1997 | McHale .................... 379/93.07 |
| 5,671,251 | A | | 9/1997 | Blackwell et al. .......... 375/222 |
| 5,673,290 | A | | 9/1997 | Cioffi ......................... 375/260 |
| 5,675,575 | A | | 10/1997 | Wall, Jr. et al. ............ 370/326 |
| 5,719,870 | A | | 2/1998 | Baker et al. ................. 370/463 |
| 5,737,333 | A | | 4/1998 | Civanlar et al. ............ 370/352 |
| 5,768,351 | A | * | 6/1998 | England ................... 379/93.37 |
| 5,771,236 | A | | 6/1998 | Sansom et al. ............. 370/458 |
| 5,781,547 | A | | 7/1998 | Wilson ....................... 370/395 |
| 5,781,617 | A | | 7/1998 | McHale et al. .......... 379/93.14 |
| 5,787,088 | A | | 7/1998 | Dagdeviren et al. ........ 370/493 |
| 5,828,666 | A | | 10/1998 | Focsaneanu et al. ........ 370/389 |
| 5,838,682 | A | | 11/1998 | Dekelbaum et al. ........ 370/401 |
| 5,841,840 | A | | 11/1998 | Smith et al. ............. 379/93.01 |
| 5,848,150 | A | | 12/1998 | Bingel ........................ 379/399 |
| 5,864,747 | A | | 1/1999 | Clark et al. .................. 455/3.2 |
| 5,878,120 | A | | 3/1999 | O'Mahony ............... 379/93.09 |
| 5,881,142 | A | | 3/1999 | Frankel et al. .............. 379/167 |
| 5,883,941 | A | | 3/1999 | Akers ...................... 379/93.08 |
| 5,889,773 | A | | 3/1999 | Stevenson, III ............. 370/352 |
| 5,889,856 | A | | 3/1999 | O'Toole et al. ............. 379/399 |
| 5,896,377 | A | | 4/1999 | Boot et al. ................... 370/352 |
| 5,898,761 | A | | 4/1999 | McHale et al. .......... 379/93.01 |
| 5,901,205 | A | | 5/1999 | Smith et al. ............. 379/93.01 |
| 5,905,781 | A | | 5/1999 | McHale et al. .......... 379/93.14 |
| 5,917,814 | A | | 6/1999 | Balatoni ..................... 370/352 |
| 5,936,952 | A | | 8/1999 | Lecomte ..................... 370/352 |
| 5,940,479 | A | | 8/1999 | Guy et al. ................ 379/93.01 |
| 5,943,404 | A | | 8/1999 | Sansom et al. .......... 379/93.06 |
| 5,949,763 | A | | 9/1999 | Lund .......................... 370/261 |
| 5,970,473 | A | * | 10/1999 | Gerszberg et al. ............. 705/26 |
| 5,974,043 | A | | 10/1999 | Solomon .................... 370/352 |
| 5,978,390 | A | | 11/1999 | Balatoni ..................... 370/540 |
| 5,999,565 | A | | 12/1999 | Locklear, Jr. et al. ....... 375/222 |
| 5,999,598 | A | | 12/1999 | Henrick et al. .......... 379/93.07 |
| 6,075,784 | A | | 6/2000 | Frankel et al. .............. 370/356 |
| 6,081,517 | A | * | 6/2000 | Liu et al. .................... 370/352 |
| 6,084,873 | A | * | 7/2000 | Russell et al. .............. 370/352 |
| 6,091,722 | A | * | 7/2000 | Russell et al. .............. 370/352 |
| 6,118,780 | A | | 9/2000 | Dunn et al. ................. 370/355 |
| 6,125,117 | A | | 9/2000 | Martin et al. ............... 370/397 |
| 6,130,879 | A | | 10/2000 | Liu ............................. 370/230 |
| 6,181,715 | B1 | | 1/2001 | Phillips et al. .............. 370/493 |
| 6,222,829 | B1 | | 4/2001 | Karlsson et al. ............ 370/329 |
| 6,259,708 | B1 | | 7/2001 | Cheng et al. ................ 370/493 |

OTHER PUBLICATIONS

T.C. Kwok, "Residential Broadband Architecture Over ADSL and G.Lite (G.992.2): PPP Over ATM," XP–000830885, IEEE Communication Magazine, 6 pages, May 1999.

Notification of Transmittal of the International Search Report or the Declaration, 7 pages, May 2, 2001.

Notification of Transmittal of the International Search Report or the Declaration, 7 pages, Jun. 29, 2001.

PCT International Search Report, 7 pages, Feb. 5, 2001.

Gudapati, et al., "Local Telephone Service for Cable Subscribers Using Packet Switched Access," ISS. World Telecommunications Congress, pp. 325–329, Sep. 21, 1997.

* cited by examiner

| SUBSCRIBER LINE IDENTIFIER | IAD IDENTIFIER | IAD STATUS | LOCAL LOOP CIRCUIT IDENTIFIER | TIME SLOT IDENTIFIER | DATA NETWORK ADDRESS | SUBSCRIBER LINE STATUS |
|---|---|---|---|---|---|---|
| 111-000-0001 | IAD #1 | NORMAL MODE | 5 | 1 | 1 | ACTIVE |
| 111-000-0002 | | | | 42 | 84 | . |
| 111-000-0003 | | | | 65 | 89 | ACTIVE |
| 111-000-0004 | | | | 98 | 259 | ACTIVE |
| 111-000-0005 | | | | 23 | 246 | . |
| 111-000-0006 | | | | 106 | 45 | . |
| 111-000-0007 | | | | 77 | 6 | . |
| 111-000-0008 | | | | 85 | 87 | . |
| 111-000-0009 | IAD #2 | BACK-UP MODE (ANALOG PORT #3) | 9 | 465 | 54 | . |
| 111-000-0010 | | | | 1812 | 656 | . |
| 111-000-0011 | | | | 1899 | 78 | . |
| 111-000-0012 | | | | 32 | 998 | . |
| 111-000-0013 | | | | 1789 | 381 | ACTIVE |
| 111-000-0014 | | | | 0588 | 765 | . |
| 111-000-0015 | | | | 21 | 5 | . |
| 111-000-0016 | | | | 564 | 54 | . |
| . . . | . . . | . . . | | . . . | . . . | . . . |
| 111-000-2041 | IAD #256 | NORMAL MODE | 21 | 0133 | 879 | ACTIVE |
| 111-000-2034 | | | | 0692 | 564 | ACTIVE |
| . . . | | | | . . . | . . . | . . . |
| 111-000-2048 | | | | 1786 | 48 | ACTIVE |

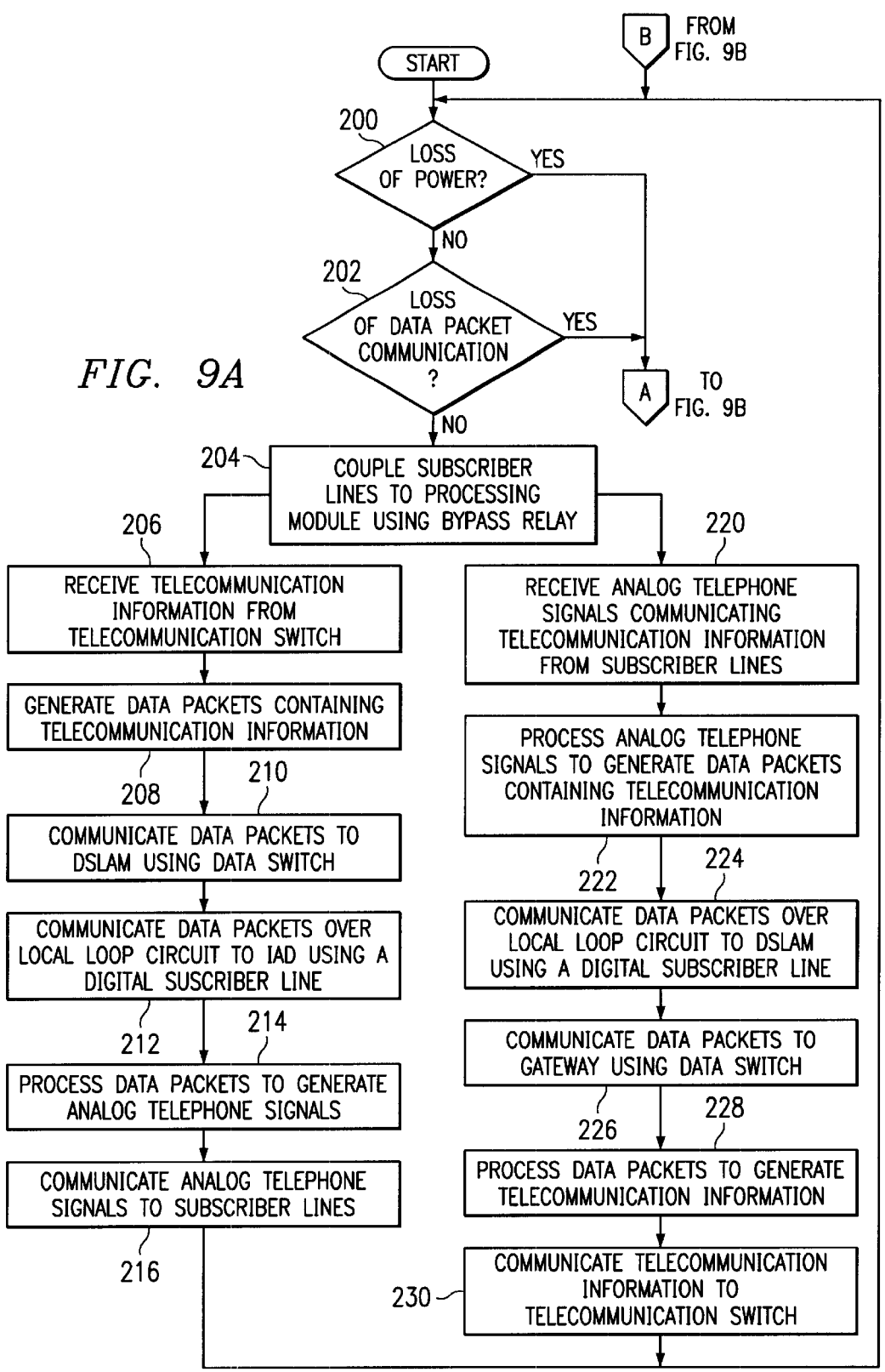

SYSTEM AND METHOD FOR COMMUNICATING TELECOMMUNICATION INFORMATION BETWEEN A TELECOMMUNICATION SWITCH AND CUSTOMER PREMISES EQUIPMENT

CROSS-REFERENCE TO RELATED APPLICATIONS

This application is related to U.S. application Ser. No. 09/502,668, filed on Feb. 11, 2000, by Peter J. Renucci, et al. and entitled, "System and Method for Communicating Telecommunication Information Between Customer Premises Equipment and Network Equipment,".

This application is related to U.S. application Ser. No. 09/502,369, filed on Feb. 11, 2000, by Peter J. Renucci, et al. and entitled, "System and Method for Communicating Telecommunication Information Between Network Equipment and a Plurality of Local Loop Circuits,".

TECHNICAL FIELD OF THE INVENTION

This invention relates generally to the field of telecommunications and, more particularly, to a system and method for communicating telecommunication information between a telecommunications switch and customer premises equipment.

BACKGROUND OF THE INVENTION

Digital subscriber line (DSL) technology was initially deployed to provide data-only service as a replacement for slower-speed, dial-up modems. Incumbent local exchange carriers (ILECs), competitive local exchange carriers (CLECs), and other telecommunication providers have begun to explore offering voice over DSL (VoDSL) service to deliver integrated voice and data services.

Unfortunately, existing VoDSL networks may not provide the degree of reliability necessary to enable true integration of telephony and data services. A typical VoDSL network requires two basic components: (1) a gateway that links the traditional telecommunications network to the DSL network and (2) an integrated access device (IAD), residing at a customer premises, that multiplexes and processes voice and data traffic between the gateway and multiple subscriber lines. If the IAD loses power or if the gateway, IAD, or other network equipment fails, the VoDSL service is terminated. Because of these architectural limitations, existing VoDSL networks do not provide the reliability of traditional telephone systems, and as a result, telecommunication providers remain wary of adopting VoDSL service.

SUMMARY OF THE INVENTION

In accordance with the present invention, a system and method for communicating telecommunication information between a telecommunication switch and customer premises equipment is provided that substantially eliminates or reduces disadvantages or problems associated with previously developed systems and methods.

In one embodiment, a system for communicating telecommunication information between a telecommunication switch and customer premises equipment includes a gateway, a processing module, and a bypass switch. The gateway receives telecommunication information from the telecommunication switch. The gateway generates data packets for communicating the telecommunication information over a local loop circuit in a first mode of operation or generates a first analog signal for communicating the telecommunication information over the local loop circuit in a second mode of operation. The processing module receives the data packets from the local loop circuit and processes the data packets to generate a second analog telephone signal communicating the telecommunication information in the first mode of operation. The bypass switch selects the second analog signal for communication to a subscriber line in the first mode of operation and selects the first analog telephone signal for communication to the subscriber line in the second mode of operation.

In another embodiment, a system for communicating telecommunication information between a telecommunication switch and customer premises equipment includes a telecommunication interface, a data packet service module, and an analog signal service module. The telecommunication interface receives telecommunication information from the telecommunication switch. The data packet service module, which couples to the telecommunication interface, receives the telecommunication information from the telecommunication interface and generates data packets for communicating the telecommunication information over a local loop circuit to the customer premises equipment in a first mode of operation. The analog signal service module, which also couples to the telecommunication interface, receives the telecommunication information from the telecommunication interface and generates an analog telephone signal for communicating the telecommunication information over the local loop circuit to the customer premises equipment in a second mode of operation.

Technical advantages of the present invention include a more reliable system and method for communicating telecommunication information between a telecommunication switch and customer premises equipment. Network equipment may communicate telecommunication information using either data packets or analog telephone signals. The network equipment may offer VoDSL service in a normal mode of operation by communicating telecommunication information over a local loop circuit using data packets. If the network equipment cannot communicate data packets with the customer premises equipment due to a power loss at the customer premises, equipment failure, or any other cause, the network equipment may provide emergency or lifeline service in a back-up mode of operation by communicating telecommunication information over the local loop circuit using a line-powered, analog telephone signal. The following description, figures, and claims further describe the present invention, including its features, functions, and technical advantages.

BRIEF DESCRIPTION OF THE DRAWINGS

FIG. 8 illustrates a table of configuration information relating to network equipment and customer premises equipment;

FIGS. 9A and 9B illustrate a flowchart of a method of communicating telecommunication information between a telecommunication network and subscriber lines;

DETAILED DESCRIPTION OF THE DRAWINGS

Figure 1:
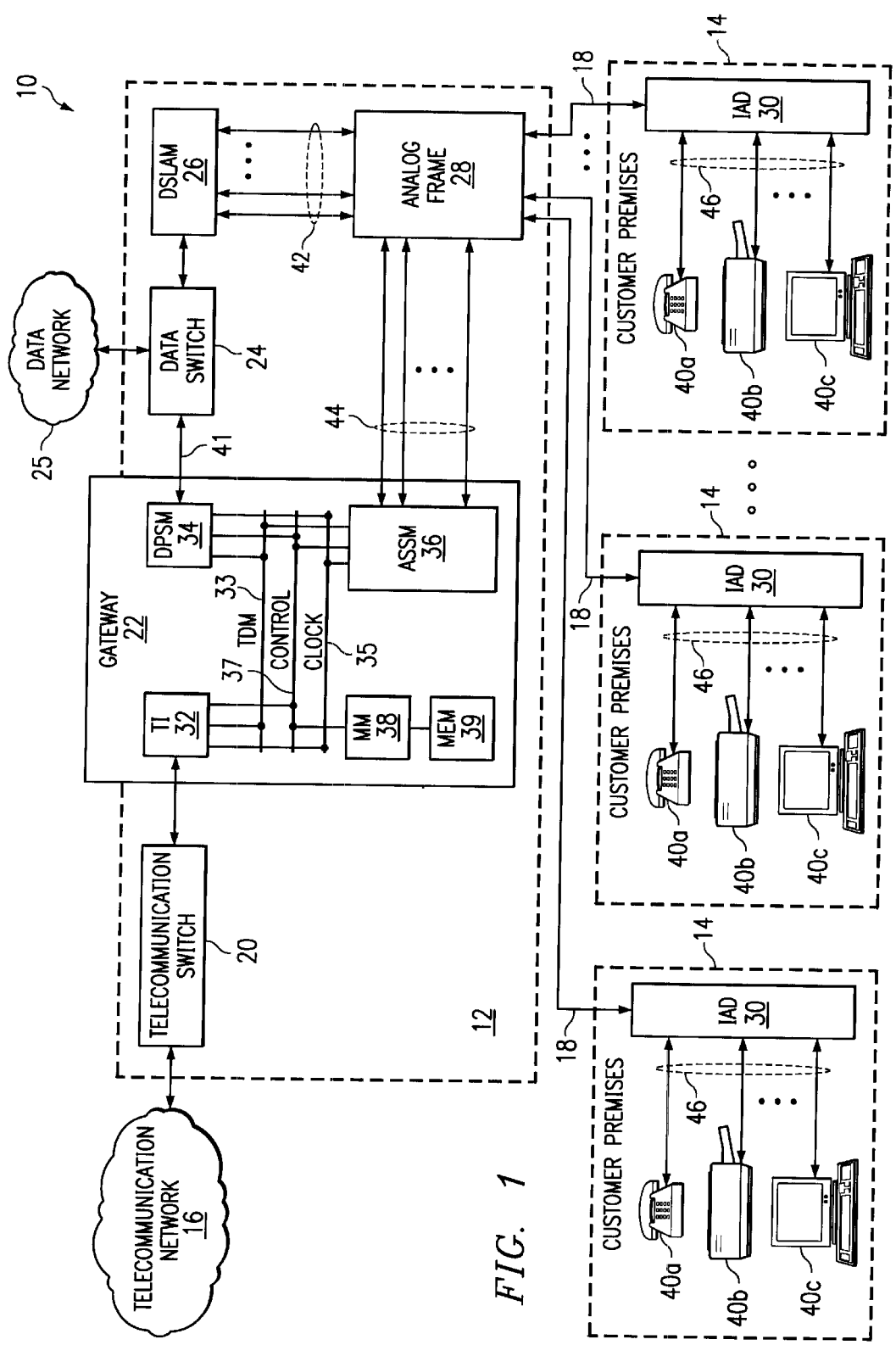
FIG. 1 illustrates a system that communicates telecommunication information between a telecommunication network and customer premises equipment.

FIG. 1 illustrates a system 10 for communicating telecommunication information between telecommunications network 16 and customer premises equipment 14 using local loop circuits 18. Telecommunication network 16 may be a public switched telephone network (PSTN), a private switched telephone network, or any other interconnected collection of telecommunication switches that provide local, long distance, or international telephone service. Telecommunication information includes voice, data, image, video, or any other type of information that may be communicated over telecommunication network 16. In a particular embodiment, local loop circuits 18 are twisted pair lines between network equipment 12 and customer premises equipment 14.

In operation, network equipment 12 and customer premises equipment 14 communicate telecommunication information over local loop circuit 18 using either data packets or an analog telephone signal. In a normal mode of operation, system 10 may offer VoDSL service by communicating the telecommunication information over local loop circuit 18 using data packets. If customer premises equipment 14 loses VoDSL service due to a power loss at the customer premises, network equipment failure, customer premises equipment failure, or any other cause, system 10 may provide emergency or lifeline service in a back-up mode of operation by communicating the telecommunication information over local loop circuit 18 using an analog telephone signal from network equipment 12.

Network equipment 12 communicates telecommunication information between telecommunication network 16 and customer premises equipment 14 using local loop circuits 18. Network equipment 12 includes a telecommunication switch 20, a gateway 22, a data switch 24, a digital subscriber line access multiplexer (DSLAM) 26, and an analog frame 28. Network equipment 12 may be located in one or more buildings, closets, or other locations. In a particular embodiment, network equipment 12 is located in a central office, remote terminal, or other telecommunication site.

Telecommunication switch 20 communicates telecommunication information between telecommunication network 16 and gateway 22. Telecommunication switch 20 may be a class 4 switch, a class 5 switch, or any other suitable switch for communicating telecommunication information between telecommunication network 16 and gateway 22. Telecommunication switch 20 and gateway 22 may communicate telecommunication information using GR-303, TR-8, signal system 7 (SS7), V5, integrated services digital network (ISDN), unbundled analog lines, or any other suitable interface.

Gateway 22 communicates telecommunication information between telecommunication switch 20 and customer premises equipment 14 using either data packets or an analog telephone signal. In a normal mode of operation, gateway 22 receives telecommunication information from switch 20 and generates data packets for communicating the telecommunication information to customer premises equipment 14. Gateway also receives data packets communicating telecommunication information from customer premises equipment 14 and processes the data packets to generate telecommunication information for communication to switch 20. In a back-up mode of operation, gateway 22 receives telecommunication information from switch 20 and generates an analog telephone signal for communicating the telecommunication information to customer premises equipment 14. Gateway 22 also receives an analog telephone signal communicating telecommunication information from customer premises equipment 14 and processes the analog telephone signal to generate telecommunication information for communication to switch 20.

Gateway 22 includes a telecommunication interface (TI) 32, a data packet service module (DPSM) 34, an analog signal service module (ASSM) 36, a management module (MM) 38, and a memory (MEM) 39. Telecommunication interface 32, data packet service module 34, analog signal service module 36, and management module 38 represent functional elements that are reasonably self-contained so that each can be designed, constructed, and updated substantially independent of the others. In a particular embodiment, telecommunication interface 32, data packet service module 34, analog signal service module 36, and management module 38 are implemented on separate printed circuit boards that may be coupled to a backplane in gateway 22.

In the illustrated embodiment, a time division multiplexing (TDM) bus 33 communicates multiple streams of telecommunication information between interface 32, data packet service module 34, and analog signal service module 36 using a single transmission channel. A clock signal 35 divides the single transmission channel into a fixed sequence of time slots, and each stream of telecommunication information is assigned a different time slot in the sequence. A control bus 37 communicates control information between interface 32, data packet service module 34, analog signal service module 36, and management module 38. Although the particular embodiment of gateway 22 described with reference to FIG. 1 includes two different buses 33 and 37, gateway 22 may use any combination of dedicated or shared communication paths to communicate telecommunication information and control information between interface 32, data packet service module 34, analog signal service module 36, and management module 38.

Telecommunication interface 32 communicates telecommunication information between switch 20 and data packet service module 34 and analog signal service module 36. Interface 32 receives telecommunication information from switch 20 and communicates the telecommunication information to data packet service module 34, analog signal service module 36, or both data packet service module 34 and analog signal service module 36. Interface 32 also receives telecommunication information from data packet service module 34 and analog signal service module 36 and communicates the telecommunication information to switch 20. In a particular embodiment, interface 32 communicates telecommunication information to switch 20, data packet service module 34, and analog signal service module 36 according to control information received from management module 38.

Data packet service module 34 communicates telecommunication information with customer premises equipment 14 using data packets. Data packet service module 34 receives telecommunication information from interface 32 and generates data packets for communicating the telecommunication information over local loop circuit 18 to customer premises equipment 14. Data packet service module 34 also receives data packets communicating telecommunication information from customer premises equipment 14 and processes the data packets to generate telecommunication information for communication to interface 32. Data packet service module 34 may communicate the telecommunication information with customer premises equipment 14 using Internet Protocol (IP), X.25, Frame Relay, Asynchronous Transfer Mode (ATM), or any other suitable data network protocol.

Analog signal service module 36 communicates telecommunication information with customer premises equipment 14 using an analog telephone signal. Analog signal service module 36 receives telecommunication information from interface 32, generates an analog telephone signal for communicating the telecommunication information over local loop circuit 18 to customer premises equipment 14, and communicates the analog telephone signal to a selected back-up analog line 44. Analog signal service module 36 provides power so that the analog telephone signal may support line-powered services, such as plain old telephone service (POTS). Analog signal service module 36 also receives, from back-up analog line 44, an analog telephone signal communicating telecommunication information from customer premises equipment 14 and processes the analog telephone signal to generate telecommunication information for communication to interface 32. Although analog telephone signals have traditionally been used to carry voice information, they are also capable of communicating other types of telecommunication information. In a particular embodiment, an analog telephone signal carries information in a frequency range of 300 to 4000 Hz.

Management module 38 manages the operation of gateway 22. Management module 38 selects a mode of operation for each IAD 30 serviced by gateway 22 and stores, in memory 39, configuration information indicating the selected mode of operation for each IAD 30. In a particular embodiment, management module 38 determines whether data packet service module 34 can communicate with IAD 30, selects the normal mode of operation in response to determining that data packet service module 34 can communicate with IAD 30, and selects the back-up mode of operation in response to determining that data packet service module 34 cannot communicate with IAD 30. For example, data packet service module 34 may establish and maintain a virtual circuit with IAD 30 to communicate data packets using an ATM protocol. In such an embodiment, management module 38 may determine whether data packet service module 34 can communicate with IAD 30 by determining whether data packet service module 34 can establish and maintain a virtual circuit with IAD 30. If data packet service module 34 cannot establish or maintain a virtual circuit with IAD 30, data packet service module 34 cannot communicate with IAD 30, and management module 38 selects the back-up mode of operation for IAD 30. Although memory 39 appears external from management module 38 in FIG. 1, memory 39 may be internal to or external from management module 38 or gateway 22 according to particular needs.

Management module 38 also manages the communication of telecommunication information. In a particular embodiment, management module 38 provisions 64 kilobits per second (kb/s) time slots in TDM bus 33 to support communication of telecommunication information between telecommunication interface 32, data packet service module 34, and analog signal service module 36. Management module 38 provisions a time slot in TDM bus 33 for each subscriber line 46 serviced by gateway 22 and stores configuration information associating the time slots with IADs 30. Provisioning of time slots may be performed at initialization of gateway 22 to support fixed time slot assignment or during operation of gateway 22 to support dynamic time slot assignment. If IAD 30 is in the normal mode of operation, data packet service module 24 identifies the time slots associated with IAD 30, receives telecommunication information from the time slots, and generates data packets for communicating the telecommunication information over local loop circuit 18 to IAD 30. If IAD 30 is in the back-up mode of operation, analog signal service module 24 identifies the time slots associated with IAD 30, receives telecommunication information from a selected one of the time slots, and generates an analog telephone signal for communicating the telecommunication information over local loop circuit 18 to customer premises equipment 14.

In a particular embodiment, management module 38 communicates control information to telecommunication interface 32, data packet service module 34, and analog signal service module 36. If IAD 30 is in the normal mode of operation, management module 38 instructs telecommunication interface 32 to communicate to data packet service module 34 any telecommunication information received from switch 20 for further communication to IAD 30. Management module 38 also instructs data packet service module 34 to generate data packets for communicating the telecommunication information over local loop circuit 18 to IAD 30. If IAD 30 is in the back-up mode of operation, management module 38 instructs telecommunication interface 32 to communicate to analog signal service module 36 any telecommunication information received from switch 20 for further communication to IAD 30. Management module 38 also instructs analog signal service module 36 to generate an analog telephone signal for communicating the telecommunication information over local loop circuit 18 to customer premises equipment 14.

Although the particular embodiment of gateway 22 described in detail with reference to FIG. 1 includes telecommunication interface 32, data packet service module 34, analog signal service module 36, management module 38, and memory 39, gateway 22 may include any combination of hardware, software, or hardware and software that communicates telecommunication information using data packets or analog telephone signals.

One or more data switches 24 communicate data packets containing telecommunication information between gateway 22 and DSLAM 26. Data switches 24 may also communicate data packets between a data network 25 and DSLAM 26. Data network 25 may include a wide area network (WAN), a local area network (LAN), the Internet, or any other interconnected collection of switches and routers that provide data services.

DSLAM 26 communicates data packets between data switch 24 and IAD 30 using DSL technology. DSLAM 26 receives data packets from data switch 24, processes the data packets to generate digital DSL data, and communicates the digital DSL data over local loop circuit 18 to IAD 30. DSLAM 26 also receives digital DSL data from local loop circuit 18, identifies data packets generated by IAD 30, and communicates the data packets to data switch 24. Asymmetric DSL (ADSL), integrated DSL (IDSL), symmetric DSL (SDSL), high-data rate DSL (HDSL), rate-adaptive DSL (RADSL), very-high data rate DSL (VDSL), DSL-LITE, or other forms of DSL technology allow data transmissions over local loop circuit 18 at greater speeds than offered by traditional dial-up modems. As a result, system 10 uses DSL technology to support broadband-based, telecommunication services over local loop circuit 18.

Analog frame 28 communicates analog telephone signals between gateway 22 and customer premises equipment 14 and communicates digital DSL data between DSLAM 26 and customer premises equipment 14. Analog frame 28 receives analog telephone signals from back-up analog lines 44 and digital DSL data from DSL lines 42 and communicates the analog telephone signals and digital DSL data over local loop circuits 18 to IADs 30. Analog frame 28 also receives analog telephone signals and digital DSL data from local loop circuits 18 and communicates the analog telephone signals to gateway 22 using back-up analog lines 44 and the digital DSL data to DSLAM 26 using DSL lines 42.

IAD 30 communicates telecommunication information between network equipment 12 and subscriber lines 46. Each subscriber line 46 may support one or more subscriber devices 40a, 40b, and 40c (collectively, subscriber devices 40). Subscriber devices 40 may include telephones 40a, facsimile machines 40b, computers 40c, or any other suitable terminal devices that communicate telecommunication information with telecommunication network 16. Subscriber devices 40 may couple to subscriber lines 46 using wireline, wireless, or any other suitable communication paths.

IAD 30 communicates telecommunication information with network equipment 12 using either an analog telephone signal or data packets. In a normal mode of operation, IAD 30 receives data packets from local loop circuit 18 and processes the data packets to generate analog telephone signals for communication to subscriber lines 46. IAD 30 also receives, from subscriber lines 46, analog telephone signals communicating telecommunication information from subscriber devices 40 and processes the analog telephone signals to generate data packets for communicating the telecommunication information to network equipment 12. In a back-up mode of operation, IAD 30 communicates an analog telephone signal between network equipment 12 and at least some of subscriber lines 46.

Although FIG. 1 illustrates telecommunication switch 20, gateway 22, data switch 24, DSLAM 26, and analog frame 28 as separate devices, the present invention contemplates that network equipment 12 may include any combination of one or more devices at one or more locations that communicate telecommunication information between telecommunication network 16 and IAD 30 using either an analog telephone signal or data packets. For example, in an alternative embodiment, a single device may perform the operations associated with gateway 22, data switch 24, DSLAM 26, and analog frame 28 in FIG. 1.

Figure 2:
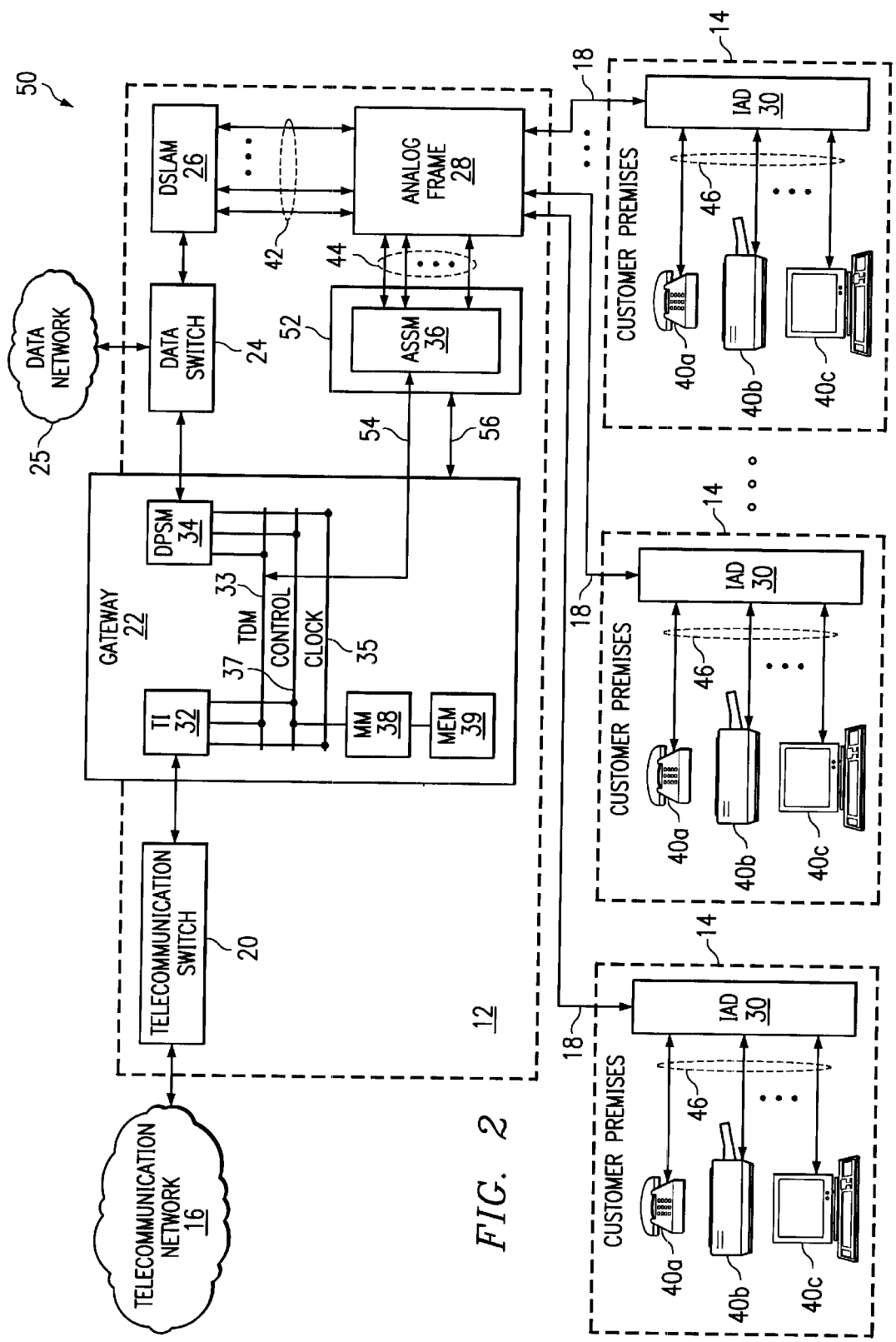
FIG. 2 illustrates the system of FIG. 1, where an analog signal service module is located external from a gateway.

FIG. 2 illustrates a system 50 in which analog signal service module 36 is located external from gateway 22. A link 54 communicates telecommunication information and control information between gateway 22 and analog signal service module 36. Link 54 may support DS-1, DS-3, OC-1, OC-3, or any other suitable interface. In a particular embodiment, link 54 is a digital interface that allows analog signal service module 36 to be located at a distance 56 from gateway 22 that may not be supported by analog lines. Such an embodiment may provide greater flexibility in installing and maintaining network equipment 12. For example, analog signal service module 36 may be located in a separate closet, room, building, or other location than gateway 22. In addition, modules other than analog signal service module 36 may also be placed in different locations external from gateway 22 and communicate with components internal to gateway 22 using TDM bus 33.

Figure 3:
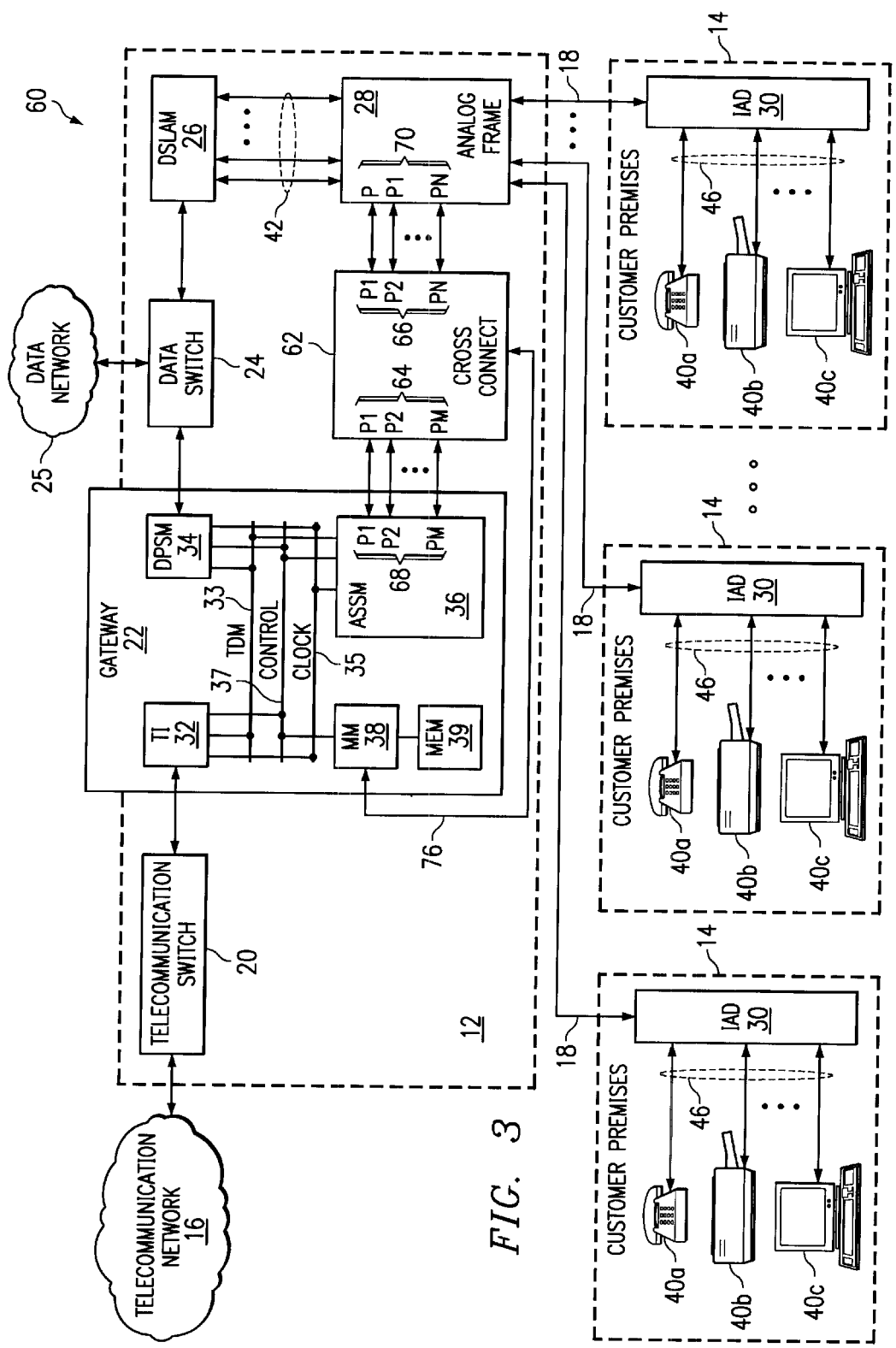
FIG. 3 illustrates a system for communicating telecommunication information between network equipment and local loop circuits.

FIG. 3 illustrates a system 60 for communicating telecommunication information between network equipment 12 and local loop circuits 18. A cross connect 62 provides an interface between analog signal service module 36 and analog frame 28. Cross connect 62 includes ports 64 and ports 66. Ports 64 couple to ports 68 of analog signal service module 36, and ports 66 couple to ports 70 of analog frame 28. Using switches, cross connect 62 can couple ports 64 to selected ports 66. As used throughout this description, the term "ports" refers to any physical or virtual representation of a communication link. Although analog signal service module 36 is internal to voice gateway 22 in FIG. 3, cross connect 62 may couple to analog signal service module 36 that is either internal to voice gateway 22 or external from voice gate 22.

Cross connect 62 communicates analog telephone signals between analog signal service module 36 and selected local loop circuits 18. Memory 39 stores configuration information associating each IAD 30 with one of local loop circuits 18. When management module 38 selects the back-up mode for one of IADs 30, cross connect 62 couples an available port 68 of analog signal service module 36 to local loop circuit 18 associated with IAD 30. Management module 38 identifies available port 68 of analog signal service module 36 and assign port 68 to IAD 30. Management module 38 communicates control information to cross connect 62 using control line 76 and instructs cross connect 62 to couple port 68 to local loop circuit 18. Cross connect 62 couples port 64 corresponding to port 68 to port 66 corresponding to local loop circuit 18, and as a result, analog signal service module 36 can communicate an analog telephone signal with IAD 30 over local loop circuit 18.

In a particular embodiment, cross connect 62 allows system 60 to oversubscribe analog signal service module 36 so that analog signal service module 36 is responsible for providing emergency or lifeline service for more local loop circuits 18 than analog signal service module 36 has ports 68. In such an embodiment, the number of local loop circuits 18 exceeds the number of ports 68. Because cross connect 62 can communicate analog telephone signals between ports 68 and selected local loop circuits 18, system 60 can support greater than 1:1 concentration.

Figure 4:
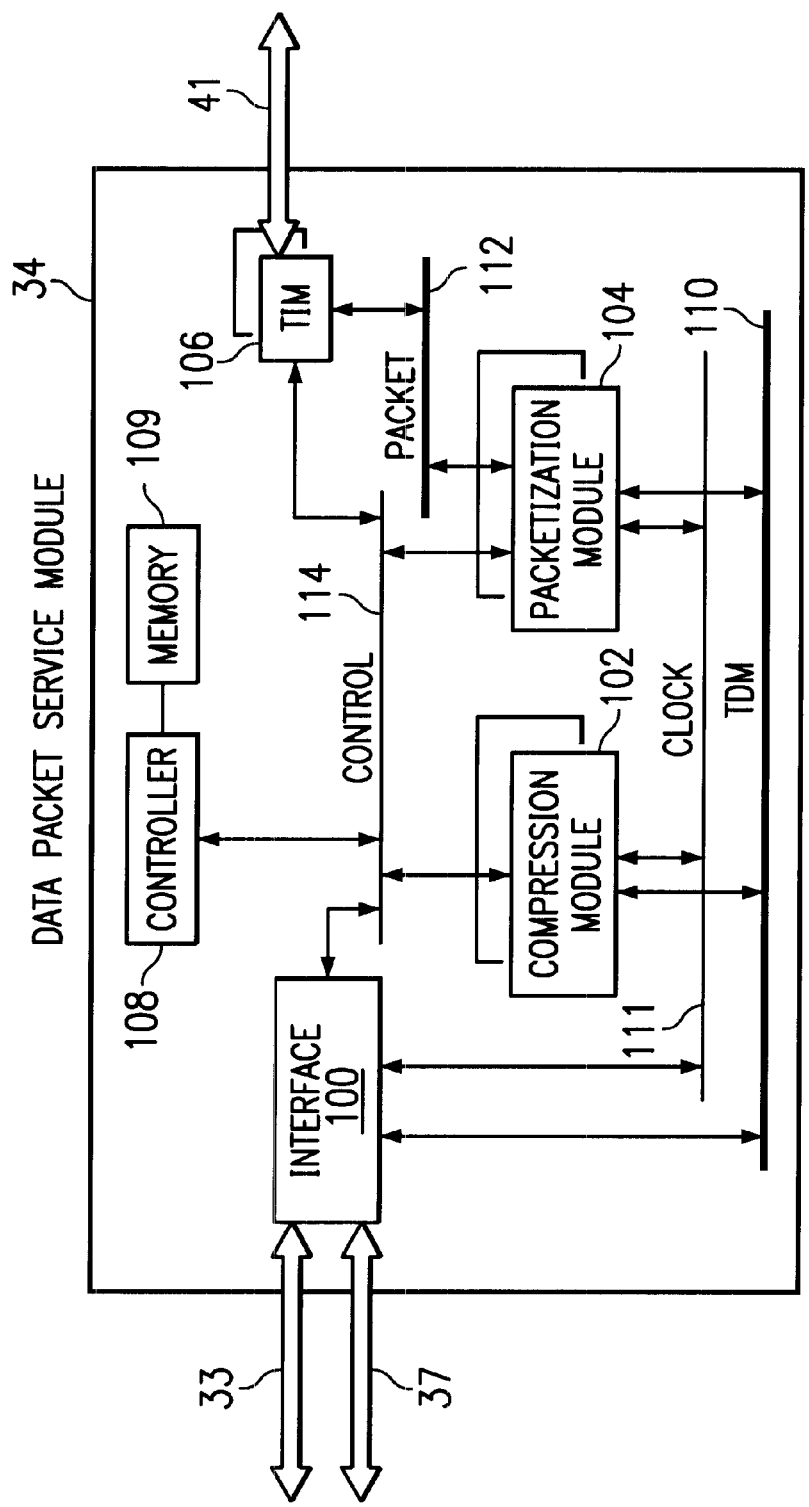
FIG. 4 illustrates a data packet service module that communicates telecommunication information using data packets.

FIG. 4 illustrates data packet service module 34 that communicates telecommunication information using data packets. Data packet service module 34 includes interface 100, compression modules 102, packetization modules 104, transmission interface modules (TIM) 106, controller 108, and memory 109. In the illustrated embodiment, TDM bus 110 communicates multiple streams of telecommunication information between interface 100, compression modules 102, and packetization modules 104 using a single transmission channel. A clock signal 111 divides the signal transmission channel into a fixed sequence of time slots, and each stream of telecommunication information is assigned a different time slot in the sequence. A data packet bus 112 communicates data packets between packetization module 104 and transmission interface modules 106, and a control bus 114 communicates control information between interface 100, compression modules 102, packetization modules 104, transmission interface modules 106, and controller 108. Although the particular embodiment of data packet service module 34 described with reference to FIG. 2 includes three different buses 110, 112, and 114, data packet service module 34 may use any combination of dedicated or shared communication paths to communicate information between interface 100, compression modules 102, packetization modules 104, transmission interface modules 106, and controller 108.

Interface 100 provides an interface between data packet service module 34 and other components in gateway 22. Interface 100 communicates telecommunication information between telecommunication interface 32 of gateway 22 and compression modules 102 and packetization modules 104 of data packet service module 34. Interface 100 also communicates control information between management module 38 of gateway 22 and controller 108 of data packet service module 34. In a particular embodiment, interface 100 communicates telecommunication information to one of compression modules 102 or packetization modules 104 according to control information received from management module 38 or controller 108.

Compression modules 102 compress and de-compress telecommunication information communicated between interface 100 and packetization modules 104. Compression modules 102 receive telecommunication information from interface 100, compress the telecommunication information, and communicate the compressed telecommunication information to packetization modules 104. Compression modules 102 also receive compressed telecommunication information from packetization modules 104, de-compress the telecommunication information, and communicate the de-compressed telecommunication information to interface 100. Compression modules 102 may compress and de-compress telecommunication information using G.711, G.722, G.723, G.728, G.729, or any other suitable compression algorithm. In a particular embodiment, compression modules 102 select a compression algorithm according to control information received from controller 108.

Packetization modules 104 process telecommunication information according to data network protocols. Packetization modules 104 receive either compressed telecommunication information from compression modules 102 or uncompressed telecommunication information from interface 100, encapsulate the telecommunication information in data packets, and communicate the data packets to transmission interface modules 106. Packetization modules 104 also receive data packets from transmission interface modules 106 and process the data packets to generate telecommunication information. If the generated telecommunication information is compressed, packetization modules 104 communicate the telecommunication information to compression modules 102. If the generated telecommunication information is uncompressed, packetization modules 104 communicate the telecommunication information directly to interface 100 bypassing compression modules 102. Packetization modules 104 may employ Internet Protocol (IP), X.25, Frame Relay, Asynchronous Transfer Mode (ATM), or any other suitable data network protocol. In a particular embodiment, packetization modules 104 select a protocol according to control information received from controller 108.

Transmission interface modules 106 communicate data packets between packetization modules 104 and data switch 24. Transmission interface modules 106 may provide a DS1, DS3, OC3, or any other suitable interface 41 to data switch 24. In a particular embodiment, transmission interface modules 106 communicate data packets to a selected interface 41 according to control information received from controller 108.

Controller 108 manages the operation of data packet service module 34. In a particular embodiment, controller 108 stores in memory 109 configuration information indicating an appropriate compression algorithm, data networking protocol, and transmission interface for each IAD 30 serviced by data packet service module 34. To communicate telecommunication information with IAD 30, controller 108 communicates control information to interface 100, compression module 102, packetization module 104, and transmission interface module 106 according to the configuration information stored in memory 109. In a particular embodiment, controller 108 communicates to compression module 102 control information indicating an appropriate compression algorithm, communicates to packetization module 104 control information indicating an appropriate data networking protocol, and communicates to transmission interface module 106 control information indicating an appropriate transmission interface. Although memory 109 appears external from controller 108 in FIG. 4, memory 109 maybe internal to or external from controller 108 according to particular needs.

Although the particular embodiment of data packet service module 34 described in detail with reference to FIG. 4 includes interface 100, compression modules 102, packetization modules 104, transmission interface modules 106, controller 108, and memory 109, data processing service module 34 may include any combination of hardware, software, or both hardware and software that communicates telecommunication information using data packets.

Figure 5:
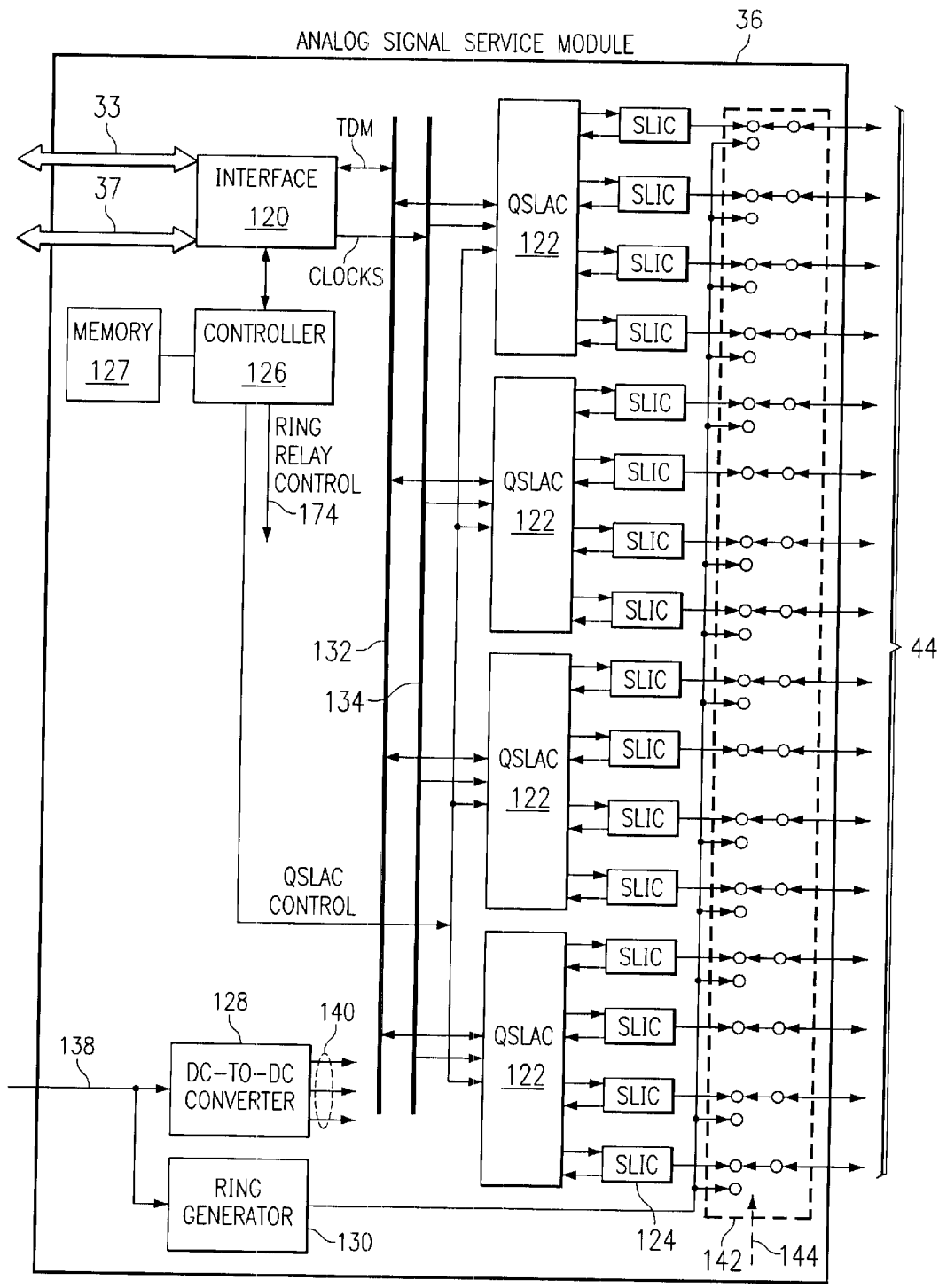
FIG. 5 illustrates an analog signal service module that communicates telecommunication information using an analog telephone signal.

FIG. 5 illustrates analog signal service module 36 that communicates telecommunication information using analog telephone signals. Analog signal service module 36 receives telecommunication information from telecommunication interface 23 of gateway 22, generates analog telephone signals for communicating the telecommunication information, and communicates the analog telephone signals to back-up analog lines 44. Analog signal service module 36 also receives analog telephone signals from back-up analog lines 44 and processes the analog telephone signals to generate telecommunication information for communication to telecommunication interface 32 of gateway 22. Analog signal service module 36 includes an interface 120, quad subscriber line audio circuits (QSLACs) 122, subscriber line interface circuits (SLICs) 124, a controller 126, a memory 127, a DC-to-DC converter 128, and a ring generator 130.

Interface 120 provides an interface between analog signal service module 36 and other modules in gateway 22. Interface 120 communicates telecommunication information between telecommunication interface 32 of gateway 22 and QSLACs 122. Interface 120 also communicates control information between management module 38 of gateway 22 and controller 126. In the illustrated embodiment, a TDM bus 132 communicates multiple streams of telecommunication information between interface 120 and QSLACs 122 using a single transmission channel. Clock signal 134 divides the single transmission channel into a fixed sequence of time slots, and each stream of telecommunication information is assigned a different time slot in the sequence. In a particular embodiment, TDM bus 132 is a 2.048 MHz serial TDM bus that is compatible with industry standard CODECs. Although the particular embodiment of analog signal service module 36 described with reference to FIG. 5 includes TDM bus 132, analog signal service module 36 may use any combination of dedicated or shared communication paths to communicate telecommunication information between interface 120 and QSLACs 122.

QSLACs 122 communicate telecommunication information between interface 120 and SLICs 124. QSLACs 122 receive serial digital data from TDM bus 132, convert the serial digital data into analog signals, and communicate the analog signals to SLICs 124. In a particular embodiment, QSLACs 122 communicate the analog signals to selected SLICs 124 according to control information received from controller 126. QSLACs 122 also receive analog signals from SLICs 124, convert the analog signals to serial digital data, and communicate the serial digital data to interface 120 using TDM bus 132. QSLACs 122 are quad programmable CODECs that may include additional integrated features. For example, QSLACs 122 may provide channel filtering, gain/equalization, hybrid balancing, line impedance matching, built-in testing, tone generation, time slot assignments, or any other suitable features.

SLICs 124 communicate analog signals between QSLACs 122 and back-up analog lines 44. Back-up analog lines 44 are duplex circuits that support independent communication in both directions simultaneously. SLICs 124 perform two wire to four wire conversion between back-up analog lines 44 and QSLACs 122 to accommodate the duplex signaling. SLICs 124 receive outgoing analog signals from QSLACs 122 and transmit the outgoing signals to back-up analog lines 44. SLICs 124 also generate incoming analog signals from back-up analog lines 44 and transmit the incoming analog signals to QSLACs 122. SLICs 124 provide power to back-up analog lines 44 and local loop circuit 18. As a result, analog signal service module 36 may provide emergency or lifeline telecommunications service to customer premises equipment 14 when the customer premises loses power. In addition, SLICs 124 may provide DC-loop feed, line testing, current limit and loop supervision, or other various functions.

DC-to-DC converter 128 provides power to analog signal service module 36. Specifically, DC-to-DC converter 128 converts the common DC voltage 138 received from gateway 22 to the various logic supplies 140 needed to power interface 120, QSLACs 122, SLICs 124, controller 126, and memory 127.

Ring generator 130 provides voltages to back-up analog lines 44 to generate ringing. Ring relay switches 142 couples ring generator 130 to back-up analog lines 44 during active ringing periods according to ring relay control 144.

Controller 126 manages the operation of analog signal service module 36. Controller 126 stores in memory 127 configuration information associating each IAD 30 with one of QSLACs 122 and SLICs 124. To communicate telecommunication information with one of IADs 30, controller 126 identifies QSLAC 122 and SLIC 124 associated with IAD 30 in memory 127. Controller 126 instructs interface 120 to communicate the telecommunication information to QSLAC 122 and instructs QSLAC 122 to communicate the analog signal communicating the telecommunication to SLIC 124. Controller 126 also communicates ring relay control 144 to ring relay switches 142 to couple ring generator 130 to back-up analog lines 44 during active ringing periods. Although memory 127 appears external from controller 126 in FIG. 5, memory 127 may be internal to or external from controller 126 according to particular needs.

Although the particular embodiment of analog signal service module 36 described in detail with reference to FIG. 5 includes interface 120, QSLACs 122, SLICs 124, controller 126, memory 127, DC-to-DC converter 128, and ring generator 130, analog signal service module 36 may include any combination of hardware, software, or both hardware and software that communicates telecommunications information using analog telephone signals.

Figure 6:
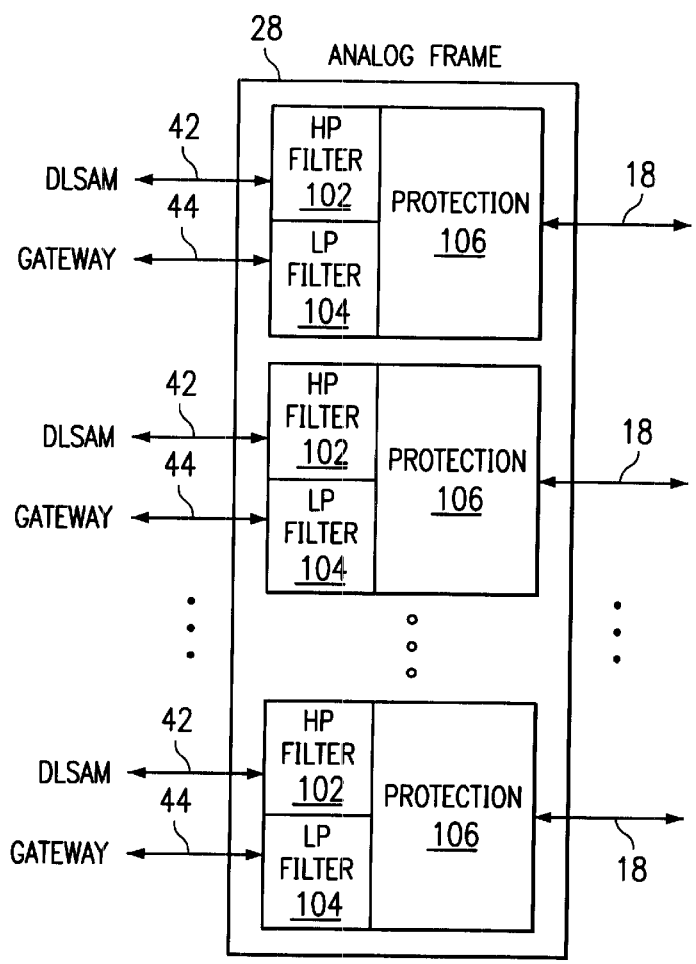
FIG. 6 illustrates an analog frame that communicates data packets and analog signals over local loop circuits.

FIG. 6 illustrates analog frame 28 that communicates data packets and analog telephone signals over local loop circuits 18. Analog frame 28 couples DSL lines 42 and back-up analog lines 44 to local loop circuits 18 using high pass filters 102, low pass filters 104, and line protection circuits 106. High pass filters 102 isolate digital DSL data communicated over DSL lines 42, and low pass filters 104 isolate analog telephone signals communicated over back-up analog lines 44. Line protection circuits 106 provide voltage protection in case of lightning strikes or AC line cross incidents.

Figure 7:
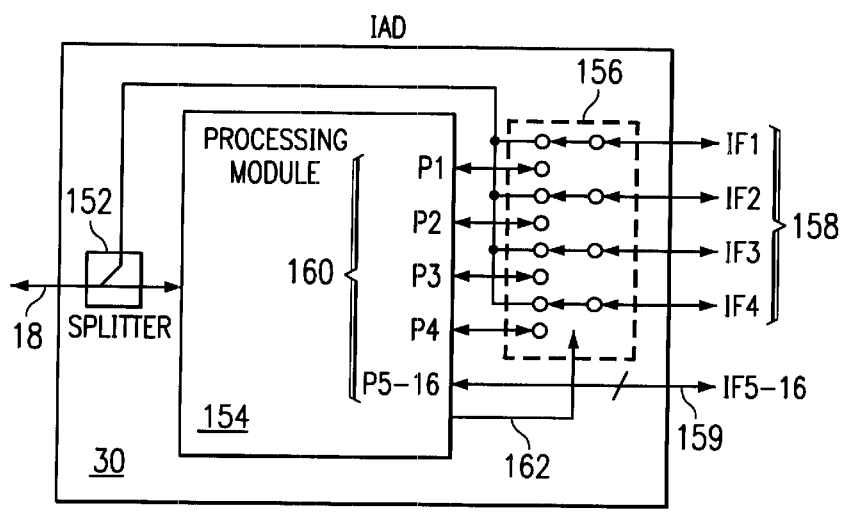
FIG. 7 illustrates an IAD that communicates telecommunication information between subscriber lines and network equipment.

FIG. 7 illustrates IAD 30 that communicates telecommunication information between subscriber lines 46 and network equipment 12 using local loop circuit 18. IAD 30 includes a splitter 152, processing module 154, bypass switches 156, and interfaces 158 and 159. In a normal mode of operation, IAD 30 may offer VoDSL service by communicating telecommunication information over local loop circuit 18 using data packets. If IAD 30 loses VoDSL service due to a power loss at the customer premises, network equipment failure, customer premises equipment failure, or any other cause, IAD 30 may provide emergency or lifeline service to subscriber lines 46 by communicating telecommunication information over local loop circuit 18 using an analog telephone signal that is line-powered from network equipment 12.

Splitter 152 couples local loop circuit 18 to processing module 154 and bypass switches 156. In a particular embodiment, splitter 152 includes a high pass filter that isolates digital DSL data for communication to processing module 154 and a low pass filter that isolates an analog telephone signal for communication to bypass switches 156. In an alternative embodiment, local loop circuit 18 directly couples to processing module 154 and bypass switches 156 without intervening filters.

Processing module 154 communicates telecommunication information with network equipment 12 using data packets when IAD 30 is in the normal mode of operation. Processing module 154 receives digital DSL data from local loop circuit 18, identifies data packets generated by gateway 22, and processes the data packets to generate analog telephone signals communicating telecommunication information. Processing module 154 communicates the analog telephone signals to ports 160 according to control information included in the data packets. Processing module 154 also receives, from ports 160, analog telephone signals communicating telecommunication information from subscriber devices 40. Processing module 154 processes the analog telephone signals to generate data packets for communicating the telecommunication information over local loop circuit 18 to network equipment 12.

Bypass switches 156 communicate analog telephone signals between interfaces 158 and either processing module 154 or local loop circuit 18. If IAD 30 is in the normal of operation, bypass switch control 162 includes a threshold current, and bypass switches 156 couple interfaces 158 to processing module 154. If IAD 30 is in the back-up mode of operation, bypass switch control 162 does not include a threshold current, and bypass switches 156 couple interfaces 158 to local loop circuit 18 using splitter 152. Because bypass switches 156 couple every interface 158 to local loop circuit 18, when IAD 30 receives a telephone call for one of subscriber lines 46, IAD 30 will communicate the call to all subscriber lines 46 coupled to interfaces 158. Thus, subscriber lines 46 coupled to interfaces 158 operate as a party line while in back-up mode. Bypass switches 156 may be solid state switches, mechanical bypass relays, or any other suitable device that provides selective coupling between interfaces 158 and either processing module 154 or local loop circuit 18.

In a particular embodiment, IAD 30 operates in the normal mode if processing module 154 has power and in the back-up mode if processing module 154 does not have power. If processing module 154 has power, processing module 154 provides a threshold current to bypass switches 156 using bypass switch control 162, and bypass switches 156 couple interfaces 158 to processing module 154. As a result, IAD 30 may offer VoDSL service to subscriber lines 46 by communicating telecommunication information over local loop circuit 18 using data packets. In the event of a power loss, processing module 154 does not provide a threshold current to bypass switches 156, and bypass switches 156 assume their unpowered state to couple interfaces 158 to local loop circuit 18. As a result, emergency or lifeline service may be provided to at least some of subscriber devices 40 when power is lost at the customer premises.

In a particular embodiment, processing module 154 determines whether it can communicate with network equipment 12 using data packets, selects the normal mode of operation in response to determining that it can communicate with network equipment 12, and selects the back-up mode of operation in response to determining that it cannot communicate with network equipment 12. For example, processing module 154 may establish and maintain a virtual circuit with gateway 22 to communicate data packets using an ATM protocol. In such an embodiment, processing module 154 may determine whether it can communicate with gateway 22 by determining whether it can maintain a virtual circuit between itself and gateway 22. If processing module 154 cannot maintain a virtual circuit, then processing module 154 cannot communicate with gateway 22 at network equipment 12. As a result, processing module 154 selects the back-up mode of operation by not providing a threshold current to backup relays 156.

Although the particular embodiment of IAD 30 described in detail with reference to FIG. 7 includes splitter 152, processing module 154, bypass switches 156, and interfaces 158 and 159 within a single device, IAD 30 may include any combination of one or more devices that communicate telecommunication information over local loop circuit 18 using data packets or an analog telephone signal. For example, in an alternative embodiment, IAD 30 may include processing module 154, and bypass switches 156 may be one or more external devices. External bypass switches 156 may be used with any standard IADs to provide emergency or lifeline service in the event of a power loss at the customer premises. Such an embodiment may provide greater flexibility, for example when upgrading IAD technology.

FIG. 8 illustrates a table 170 that includes configuration information relating to network equipment 12 and customer premises equipment 14. Management module 38 may store the configuration information in memory 39 using arrays, link lists, pointers, or any other suitable data programming techniques. In addition, all or a portion of table 170 may be maintained in memory 109 of data packet service module 34, memory 157 of analog signal service module 36, or any other component of system 10.

Table 170 includes columns 172, 174, 176, 178, 180, 182, and 184. Column 172 identifies subscriber lines 46 serviced by gateway 22. In the illustrated embodiment, the subscriber line identifiers are telephone numbers. Using IAD identifiers, column 174 associates each subscriber line identifier in column 172 with one of IADs 30. Column 176 indicates whether each IAD 30 in column 174 is operating in the normal mode or the backup mode. Using local loop circuit identifiers, column 178 associates each IAD 30 in column 174 with one of local loop circuits 18. Using time slot identifiers, column 180 associates each subscriber line identifier in column 172 with a time slot in TDM bus 33. Using address identifiers, column 182 associates each subscriber line identifier in column 172 with a data network address. Column 184 indicates whether each subscriber line 46 identified in column 172 is active. Although table 170 uses decimal numbers to identify subscriber lines 46, IADs 30, local loop circuits 18, time slots, and data network addresses, management module 38 may use any combination of numbers, letters, symbols, addresses, or any other suitable information as identifiers.

Management module 38 uses the configuration information in table 170 to manage the operation of gateway 22. For example, when data packet service module 34 cannot communicate data packets with one of IADs 30, management module 38 identifies IAD 30 in column 174 and changes its associated IAD status in column 176 to indicate that IAD 30 is in the back-up mode. In addition, management module 38 may identify local loop circuit 18 associated with IAD 30 in column 178 and communicates control information to cross connect 62 to couple an available port 68 of analog signal service module 34 to local loop circuit 18.

Gateway 22 also uses the configuration information in table 170 to communicate telecommunication information to customer premises equipment 14. When gateway 22 receives telecommunication information for communication to one of subscriber lines 46, gateway 22 identifies IAD 30 servicing subscriber line 46 using columns 172 and 174. Gateway 22 determines whether IAD 30 is in the normal model or the back-up mode using column 176.

If IAD 30 is in the normal mode, gateway 22 determines whether subscriber line 46 is active using column 184. If subscriber line 46 is active, gateway 22 communicates to switch 20 status information indicting that subscriber line 46 is busy. If subscriber line 46 is not active, interface 32 identifies the time slot associated with subscriber line 46 using column 180 and communicates the received telecommunication information to data packet service module 34 using the identified time slot. Data packet service module 34 identifies the data network address associated with subscriber line 46 using column 182 and generates data packets with the identified address for communicating the telecommunication information over local loop circuit 18 to IAD 30.

If IAD 30 is in the back-up mode, gateway 22 determines whether any subscriber line 46 serviced by IAD 30 is active according to column 184. If any subscriber line 46 is active, gateway 22 communicates to switch 20 status information indicating that subscriber line 46 is busy. If none of subscriber lines 46 are active, interface 32 identifies the time slot associated with subscriber line 46 using column 180 and communicates the received telecommunication information to analog signal service module 36 using the identified time slot. As described above, analog signal service module generates an analog telephone signal for communicating the telecommunications information and communicates the analog telephone signal to available port 68. Cross connect 62 communicates the analog telephone signal from port 68 to local loop circuit 18.

Figure 9B:
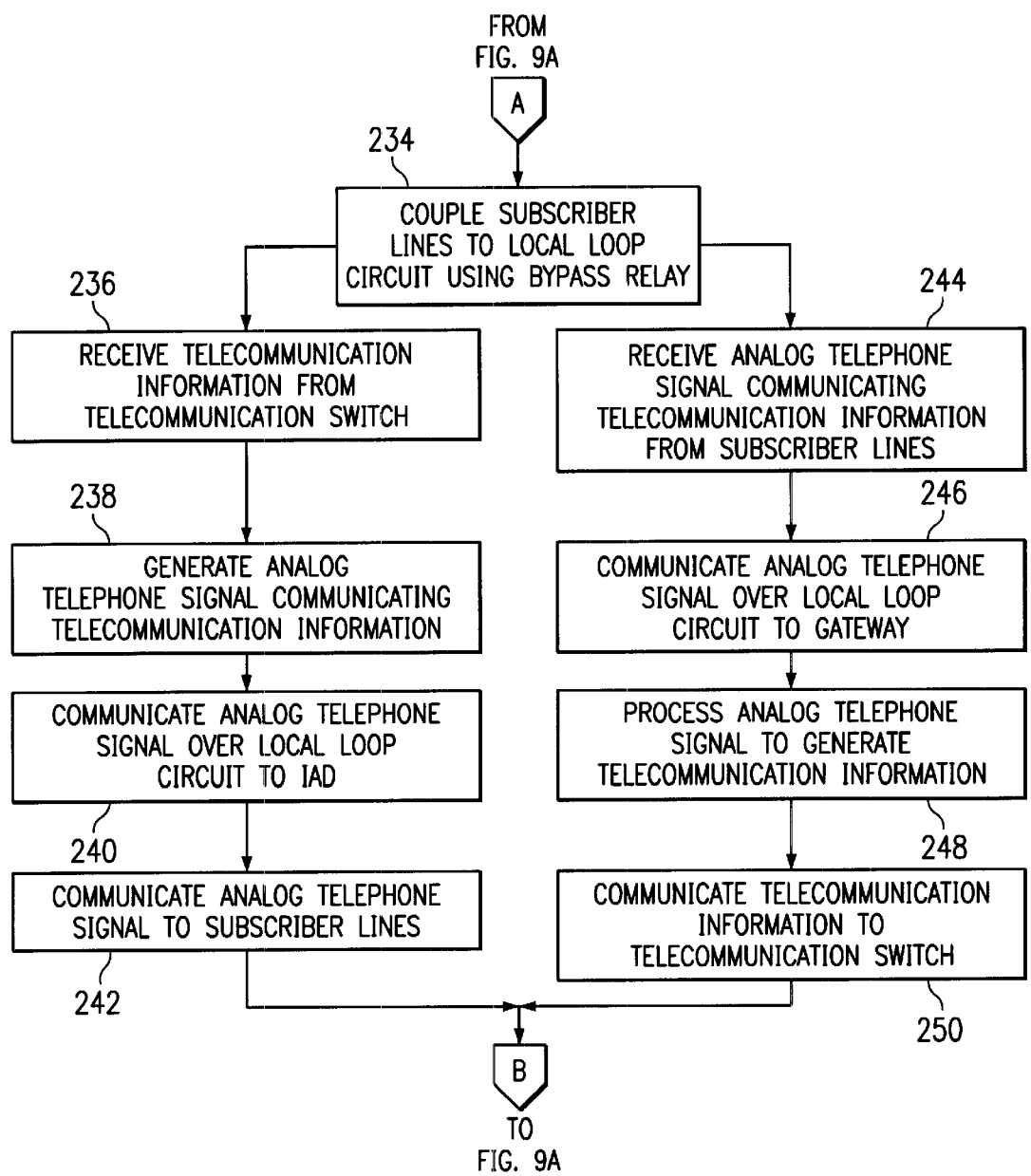

FIGS. 9A and 9B illustrate a flowchart of a method of communicating telecommunication information between telecommunication network 16 and subscriber lines 46. The method begins at step 200, where IAD 30 may lose power. If IAD 30 loses power at step 200 or if gateway 22 and IAD 30 cannot communicate data packets with one another at step 202, then the method continues at step 234. If IAD 30 has power at step 200 and if gateway 22 and IAD 30 can communicate data packets with one another at step 202, then the method continues at step 204. Bypass switches 156 couple subscriber lines 46 to processing module 154 at step 204, and the method continues by simultaneously or in series, as appropriate, performing steps 206–216 and 220–230.

Steps 206–216 communicate telecommunication information from telecommunication switch 20 to subscriber lines 46. Gateway 22 receives telecommunication information from telecommunication switch 20 at step 206, generates data packets containing the telecommunication information at step 208, and communicates the data packets to DSLAM 26 using data switch 24 at step 210. DSLAM 26 communicates the data packets over local loop circuit 18 to IAD 30 using DSL technology at step 212. IAD 30 processes the data packets to generate analog telephone signals at step 214 and communicates the analog telephone signals to subscriber lines 46 at step 216.

Steps 220–230 communicate telecommunication information from subscriber lines 46 to telecommunication switch 20. IAD 30 receives analog telephone signals communicating telecommunication information from subscriber lines 46 at step 220, processes the analog telephone signals to generate data packets containing the telecommunication information at step 222, and communicates the data packets over local loop circuit 18 to DSLAM 26 using digital subscriber line technology at step 224. DSLAM 26 communicates the data packets to gateway 22 using data switch 24 at step 226. Gateway 22 processes the data packets to generate telecommunication information at step 228 and communicates the telecommunication information to telecommunication switch 20 at step 230.

At step 234, bypass switch 156 couples subscriber lines 46 to local loop circuit 18. The method continues by simultaneously or in series, as appropriate, performing steps 236–242 and steps 244–250.

Steps 236–242 communicate telecommunication information from telecommunication switch 20 to subscriber lines 46. Gateway 22 receives telecommunication information from telecommunication switch 20 at step 236, generates an analog telephone signal communicating the telecommunication information at 238, and communicates the analog telephone signal over local loop circuit 18 to IAD 30 at step 240. IAD 30 communicates the analog telephone signal from local loop circuit 18 to subscriber lines 46 at step 242.

Steps 244–250 communicate telecommunication information from subscriber lines 46 to telecommunication switch 20. IAD 30 receives an analog telephone signal communicating telecommunication information from subscriber lines 46 at step 244 and communicates the analog telephone signal to gateway 22 using local loop circuit 18 at step 246. Gateway 22 processes the analog telephone signal to generate telecommunication information at step 248 and communicates the telecommunication information to telecommunication switch 20 at step 250. After steps 236–242 and steps 244–250, the method returns to step 200.

Figure 10A:
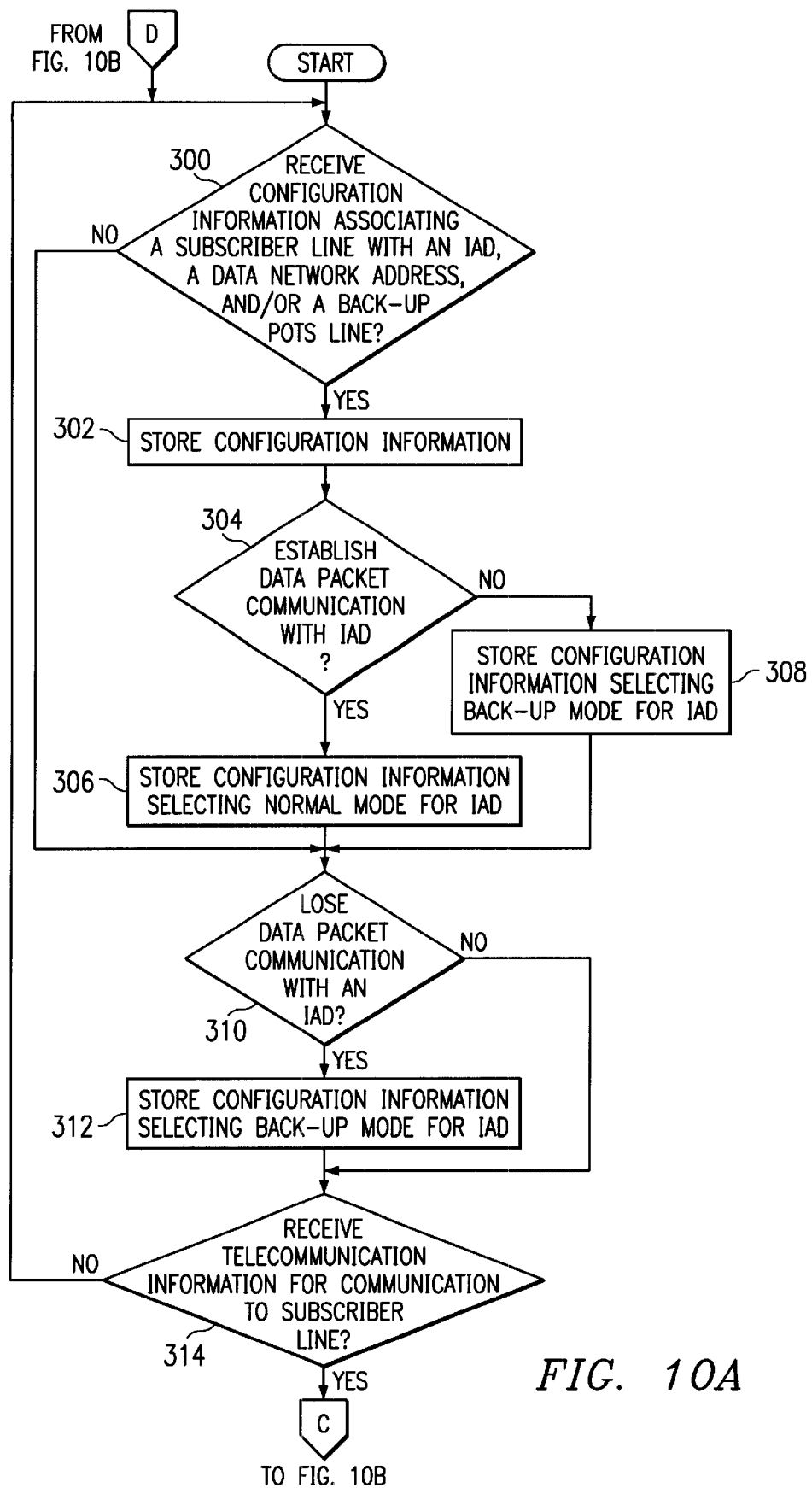
FIGS. 10A and 10B illustrate a flowchart of a method of communicating telecommunication information between a telecommunication network and customer premises equipment.
Figure 10B:
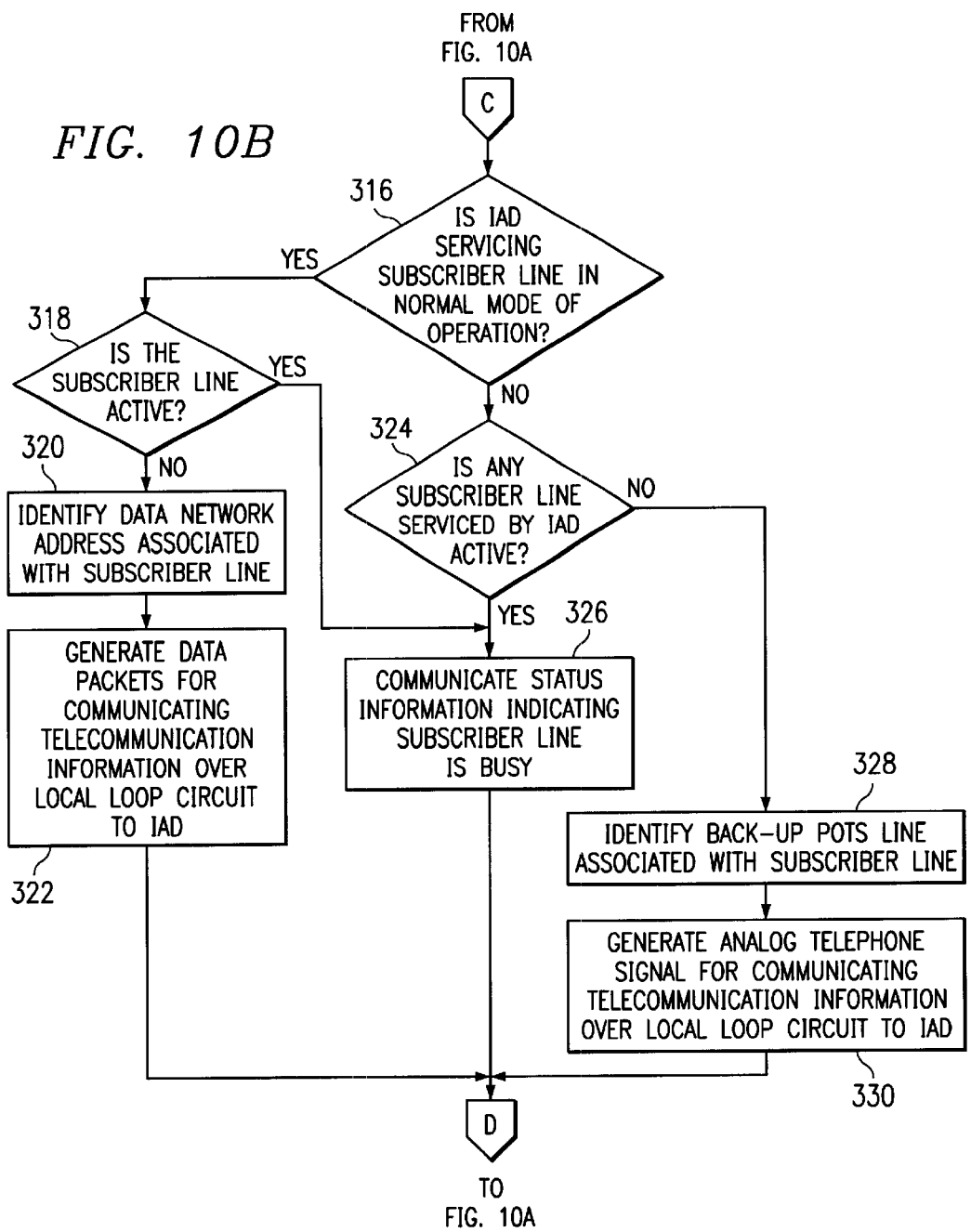

FIGS. 10A and 10B illustrate a flow chart of a method of communicating telecommunication information between telecommunication network 16 and customer premises equipment 14. The method begins at step 300, where gateway 22 may receive configuration information associating a subscriber line 46 with an IAD 30, a data network address, and/or a back-up analog line 44. If gateway 22 does not receive configuration information, the method continues at step 310. If gateway 22 receives configuration information, gateway 22 stores the configuration at step 302 and attempts to establish data packet communication with IAD 30 at step 304. If gateway 22 establishes data packet communication with IAD 30, gateway 22 stores configuration information selecting the normal mode of operation for IAD 30 at step 306. If gateway 22 cannot establish data packet communication with IAD 30, gateway 22 stores configuration information selecting the back-up mode of operation for IAD 30 at step 308.

At step 310, gateway 22 may lose data packet communication with one of IADs 30. If gateway 22 loses data packet communication with one of IADs 30, gateway 22 stores configuration information selecting the back-up mode for IAD 30 at step 312.

Gateway 22 may receive, from switch 20, telecommunication information for communication to one of subscriber lines 46 at step 314. If gateway 22 does not receive telecommunication information for communication to subscriber line 46, the method returns to step 300. If gateway 22 receives telecommunication information for communication to subscriber line 46, gateway 22 determines whether IAD 30 servicing subscriber line 46 is in the normal mode of operation at step 316. If IAD 30 is not in the normal mode, the method continues at step 324. If IAD 30 is in the normal mode, gateway 22 determines whether subscriber line 46 is active at step 318. If subscriber line 46 is active, gateway 22 communicates to switch 20 status information indicating that subscriber line 46 is busy at step 326, and the method continues at step 300. If the subscriber line is not active, gateway 22 identifies the data network address associated with subscriber line 46 at step 320 and generates data packets for communicating the telecommunication information over local loop circuit 18 to IAD 30 at step 322. The method continues at step 300.

At step 324, gateway 22 determines whether any subscriber line 46 serviced by IAD 30 is active. If any subscriber line 46 is active, gateway 22 communicates to switch 20 status information indicating that subscriber line 46 is busy at step 326, and the method continues at step 300. If none of subscriber lines 46 are active, gateway 22 identifies back-up analog line 44 associated with subscriber line 46 at step 328 and generates an analog telephone signal for communicating telecommunication information over local loop circuit 18 to IAD 30 at step 330. The method continues at step 300.

Figure 11:
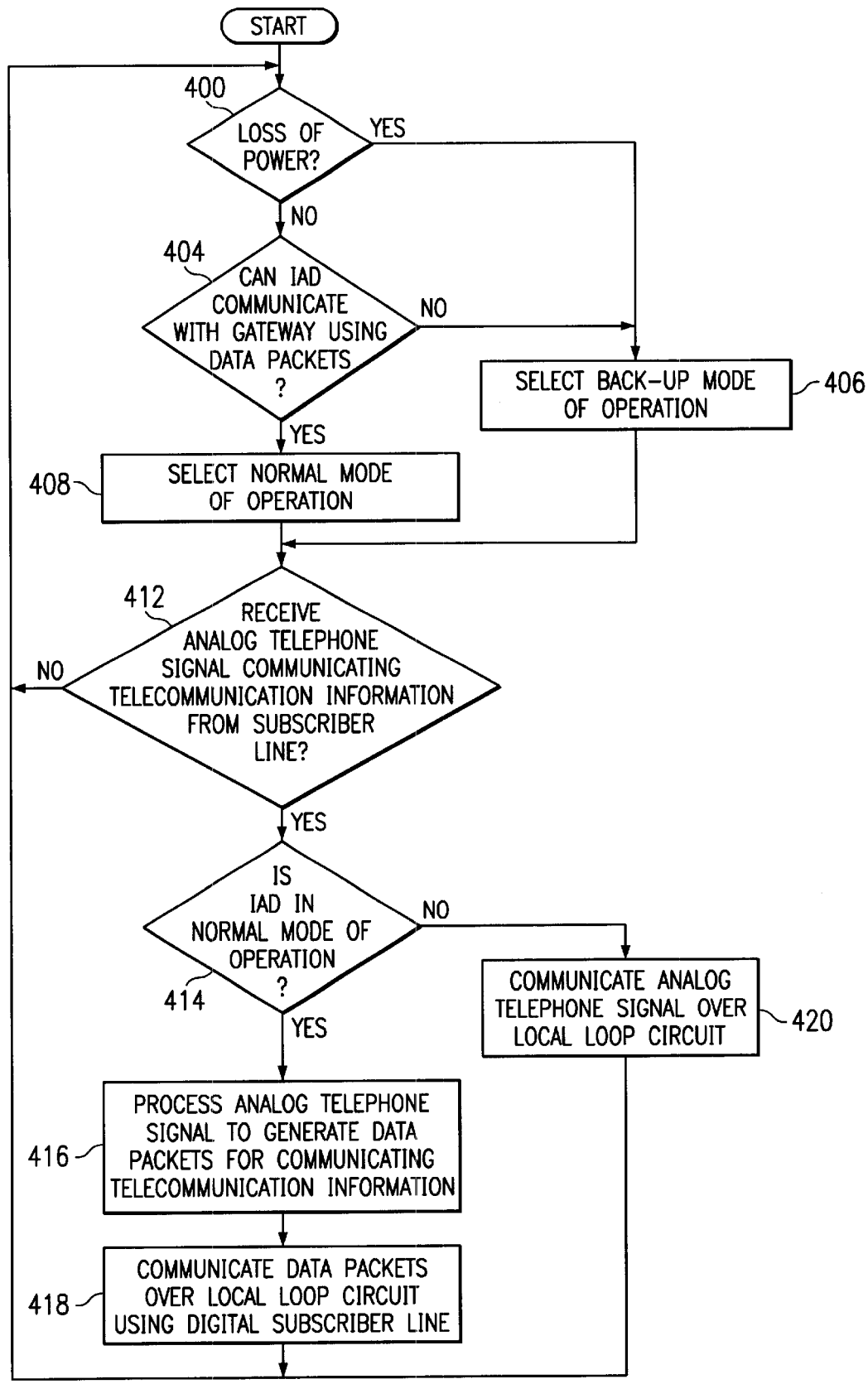
FIG. 11 illustrates a flowchart of a method of communicating telecommunication information between customer premises equipment and network equipment.

FIG. 11 illustrates a flowchart of a method of communicating telecommunication information between customer premises equipment 14 and network equipment 12. The method begins at step 400, where IAD 30 may lose power. If IAD 30 loses power, IAD 30 selects a back-up mode of operation at step 406, and the method continues at step 412. At step 404, IAD 30 determines whether it can communicate with gateway 22 using data packets. If IAD 30 cannot communicate with gateway 22 using data packets, IAD 30 selects the back-up mode of operation at step 406, and the method continues at step 412. If IAD 30 can communicate with gateway 22 using data packets, IAD 30 selects the normal mode of operation at step 408.

At step 412, IAD 30 may receive an analog telephone signal communicating telecommunication information from subscriber line 46. If IAD 30 does not receive an analog telephone signal, the method returns to step 400. If IAD 30 receives an analog telephone signal at step 412 and is in a normal mode of operation at step 414, IAD 30 processes the analog telephone signal to generate data packets for communicating the telecommunication information at step 416 and communicates the data packets over local loop circuit 18 using a digital subscriber line at step 418. If IAD 30 receives an analog telephone signal at step 412 and is not in a normal mode of operation at step 414, IAD 30 communicates the analog telephone signal over local loop circuit 18 at step 420. The method continues at step 400.

Figure 12A:
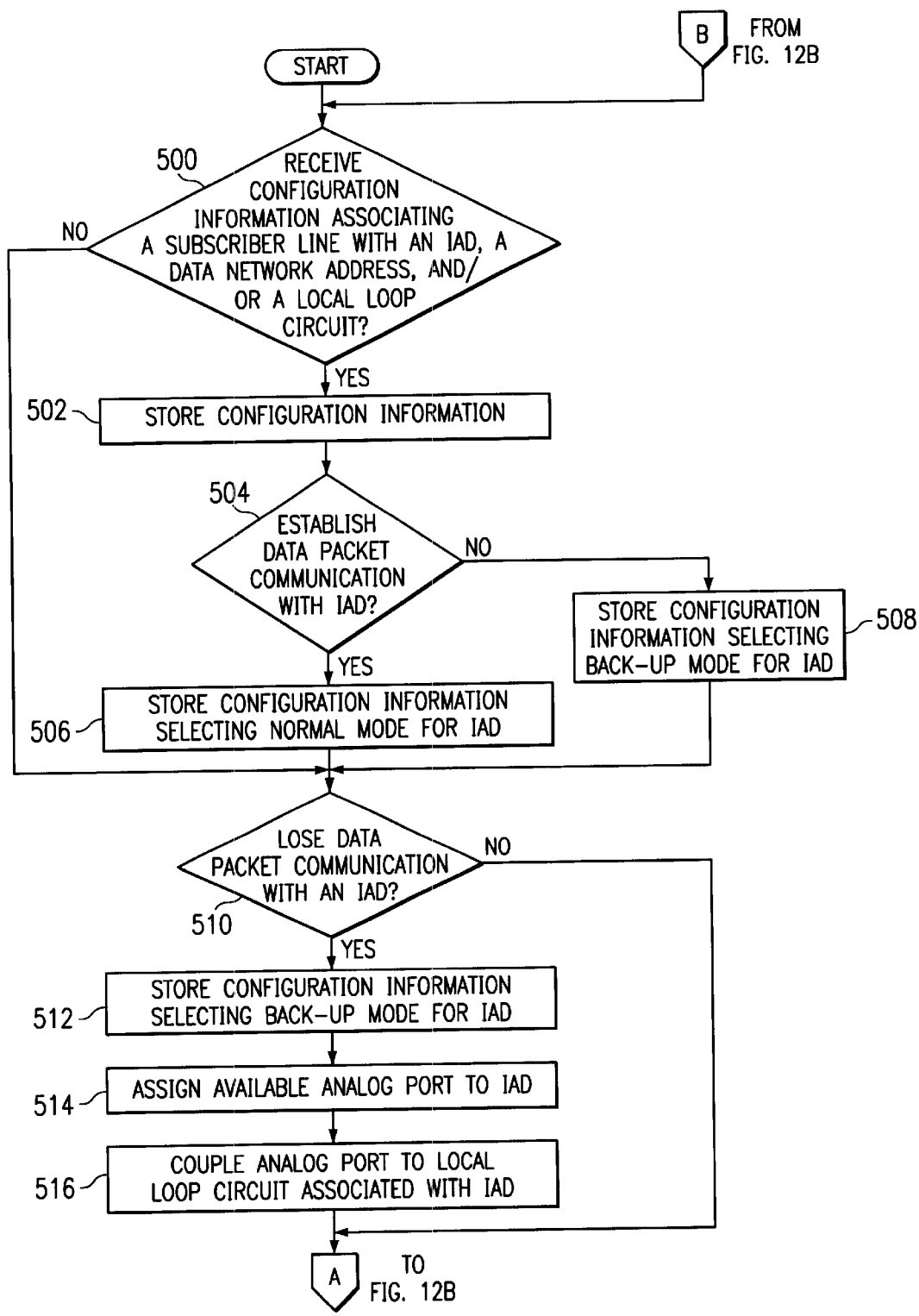
FIGS. 12A and 12B illustrate a flowchart of a method of communicating telecommunication information between network equipment and local loop circuits.
Figure 12B:
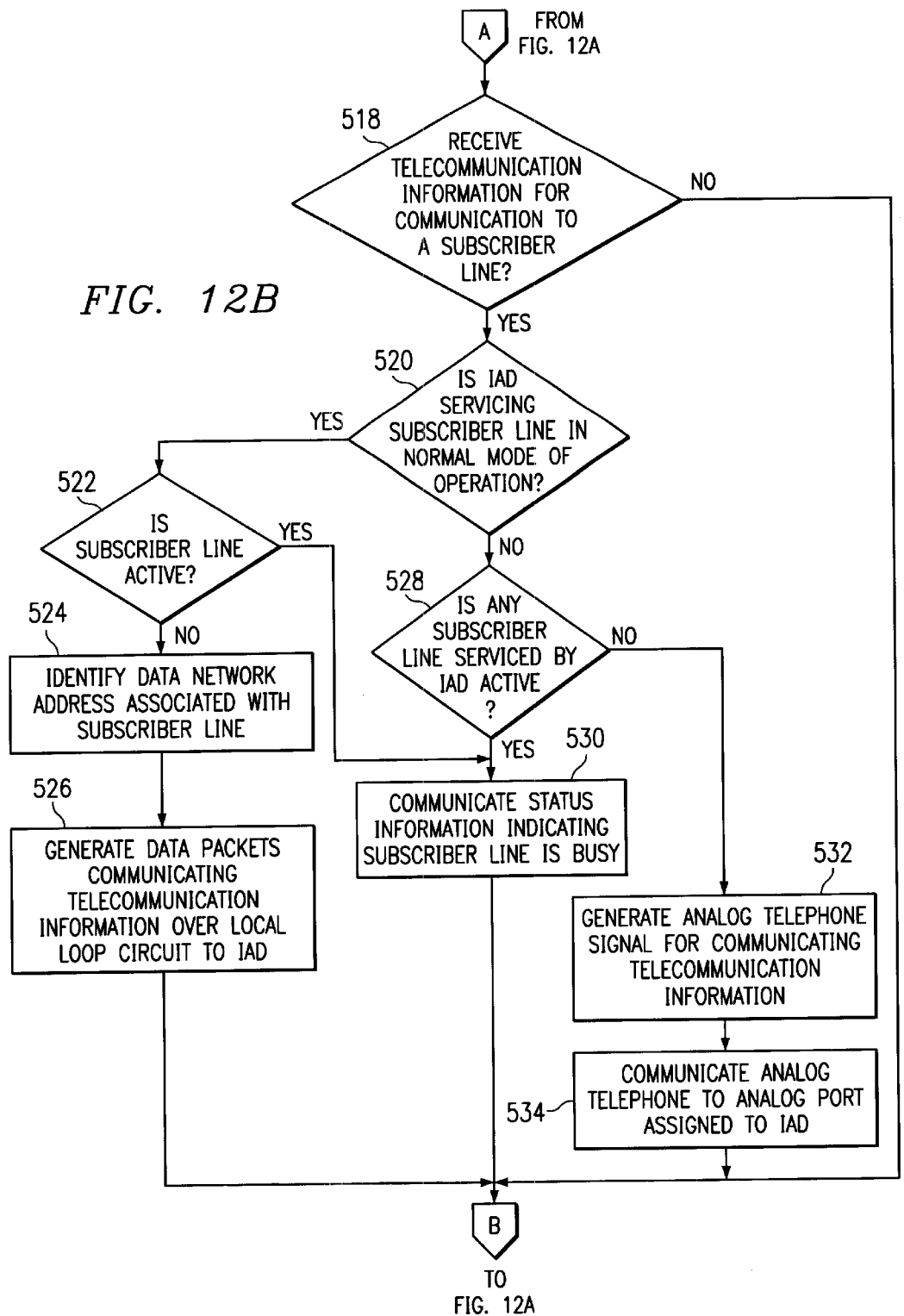

FIGS. 12A and 12B illustrate a flowchart of a method of communicating telecommunication information between network equipment 12 and local loop circuits 18. The method begins at step 500, where gateway 22 may receive configuration information associating a subscriber line 46 with an IAD 30, a data network address, and/or a local loop circuit 18. If gateway 22 does not receive configuration information, the method continues at step 510. If gateway 22 receives configuration information, gateway 22 stores the configuration information at step 502 and attempts to establish data packet communication with IAD 30 at step 504. If gateway 22 establishes data packet communication with IAD 30, gateway 22 stores configuration information selecting the normal mode of operation for IAD 30 at step 506. If gateway 22 cannot establish data packet communication with IAD 30, gateway 22 stores configuration information selecting the back-up mode of operation for IAD 30 at step 508.

At step 510, gateway 22 may lose data packet communication with one of IADs 30 serviced by gateway 22. If gateway 22 does not lose data packet communication with one of IADs 30, the method continues at step 518. If gateway 22 loses data packet communication with one of IADs 30, gateway 22 stores configuration information selecting the back-up mode of operation for IAD 30 at step 512. Gateway 22 assigns an available port 68 of analog signal service module 36 to IAD 30 at step 514. Gateway 22 couples analog port 68 to local loop circuit 18 associated with IAD 30 using cross connect 62 at step 516.

At step 518, gateway 22 may receive, from switch 20, telecommunication information for communication to one of subscriber lines 46. If gateway 22 does not receive telecommunication information for communication to subscriber line 46, the method continues at step 500. If gateway 22 receives telecommunication information for communication to subscriber line 46, gateway 22 determines whether IAD 30 servicing subscriber line 46 is in the normal mode of operation at step 520. If IAD 30 is not in the normal mode, the method continues at step 528. If IAD 30 is in the normal mode, gateway 22 determines whether subscriber line 46 is active at step 522. If subscriber line 46 is active, gateway 22 communicates to switch 20 status information indicating that subscriber line 46 is busy at step 530, and the method continues at step 500. If subscriber line 46 is not active, gateway 22 identifies the data network address associated with subscriber line 46 at step 524 and generates data packets for communicating the telecommunication information over local loop circuit 18 to IAD 30 at step 526. The method continues at step 500.

At step 528, gateway 22 determines whether any subscriber line 46 serviced by IAD 30 is active. If any subscriber line 46 is active, gateway 22 communicates to switch 20 status information indicating that subscriber line 46 is busy at step 530, and the method continues at step 500. If none of subscriber lines 46 are active, gateway 22 generates an analog telephone signal for communicating telecommunication information at step 532 and communicates the analog telephone signal to analog port 68 assigned to IAD 30 at step 534. The method continues at step 500.

Although the present invention has been described with several embodiments, a myriad of changes, variations, alterations, transformations, modifications may be suggested to one skilled in the art, and it is intended that the present invention encompass such changes, variations, alterations, transformations, and modifications as fall within the scope of the appended claims.

What is claimed is:

1. A system for communicating telecommunication information between a telecommunication switch and customer premises equipment, comprising:

a gateway operable to receive the telecommunication information from the telecommunication switch, to generate data packets for communicating the telecommunication information over a local loop circuit in a first mode of operation, and to generate a first analog telephone signal for communicating the telecommunication information over the local loop circuit in a second mode of operation;

a processing module operable to receive the data packets from the local loop circuit and to process the data packets to generate a second analog telephone signal communicating the telecommunication information in the first mode of operation; and a bypass switch operable to select the second analog telephone signal for communication to a subscriber line in the first mode of operation and to select the first analog telephone signal for communication to the subscriber line in the second mode of operation.

2. The system of claim 1, wherein:

the telecommunication information is voice information; and the first and second analog telephone signals are voice signals.

3. The system of claim 1, wherein the data packets are communicated over the local loop circuit using a digital subscriber line.

4. The system of claim 1, wherein the bypass switch operates in the first mode if the processing module has power and in the second mode if the processing module does not have power.

5. The system of claim 1, wherein the gateway is further operable to:

determine whether it can communicate with the processing module using the data packets;

select the first mode of operation in response to determining that it can communicate with the processing module using the data packets; and select the second mode of operation in response to determining that it cannot communicate with the processing module using the data packets.

6. The system of claim 5, wherein the gateway determines that it can communicate with the processing module if the gateway can maintain a virtual circuit between itself and the processing module.

7. The system of claim 1, wherein the processing module is further operable to:

determine whether it can communicate with the gateway using the data packets;

select the first mode of operation in response to determining that it can communicate with the gateway using the data packets; and select the second mode of operation in response to determining that it cannot communicate with the gateway using the data packets.

8. The system of claim 7, wherein the processing module determines that it can communicate with the gateway if the processing module can maintain a virtual circuit between itself and the gateway.

9. The system of claim 7, wherein the processing module determines that it cannot communicate with the gateway if the processing module is disconnected from the local loop circuit or has an internal failure.

10. The system of claim 1, wherein:

the bypass switch selects the first analog telephone signal for communication to the subscriber line by coupling the local loop circuit to the subscriber line; and the bypass switch selects the second analog telephone signal for communication to the subscriber line by coupling a port of the processing module to the subscriber line.

11. The system of claim 1, further comprising a plurality of bypass switches operable to select the first analog telephone signal for communication to a plurality of subscriber lines in the second mode of operation.

12. A system for communicating telecommunication information between a telecommunication switch and customer premises equipment, comprising:

a telecommunication interface operable to receive the telecommunication information from the telecommunication switch;

a data packet service module coupled to the telecommunication interface and operable to receive the telecommunication information from the telecommunication interface and to generate data packets for communicating the telecommunication information over a local loop circuit to the customer premises equipment in a first mode of operation;

an analog signal service module coupled to the telecommunication interface and operable to receive the telecommunication information from the telecommunication interface and to generate an analog telephone signal for communicating the telecommunication information over the local loop circuit to the customer premises equipment in a second mode of operation; and a management module operable to determine whether the data packet service module can communicate with an integrated access device (IAD) at the customer premises equipment, to select the first mode of operation in response to determining that the data packet service module can communicate with the IAD, and to select the second mode of operation in response to determining that the data packet service module cannot communicate with the IAD.

13. The system of claim 12, wherein the management module determines that the data packet service module can communicate with the IAD if the data packet service module can maintain a virtual circuit between the gateway and the IAD.

14. A method of communicating telecommunication information between a telecommunication switch and customer premises equipment using a gateway, comprising:

receiving the telecommunication information from the telecommunication switch;

generating data packets for communicating the telecommunication information over a local loop circuit to the customer premises equipment in a first mode of operation; and generating an analog telephone signal for communicating the telecommunication information over the local loop circuit to the customer premises equipment in a second mode of operation;

identifying a destination integrated access device (IAD) for the telecommunication information;

determining whether the gateway can communicate with the IAD using the data packets;

selecting the first mode of operation in response to determining that the gateway can communicate with the IAD using the data packets; and selecting the second mode of operation in response to determining that the gateway cannot communicate with the IAD using the data packets.

15. The method of claim 14, wherein determining whether the gateway can communicate with the IAD using the data packets further comprises determining whether the gateway can maintain a virtual circuit between itself and the IAD.

16. The method of claim 14, further comprising determining that the gateway cannot communicate with the IAD using the data packets if the IAD loses powers, is disconnected from the local loop circuit, or has an internal failure.

* * * * *